(12) United States Patent
Huang et al.

(10) Patent No.: US 12,092,737 B2
(45) Date of Patent: Sep. 17, 2024

(54) DISTANCE DETECTION APPARATUSES

(71) Applicant: SZ DJI TECHNOLOGY CO., LTD., Shenzhen (CN)

(72) Inventors: Huai Huang, Shenzhen (CN); Xiaoping Hong, Shenzhen (CN); Likui Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 995 days.

(21) Appl. No.: 17/082,219

(22) Filed: Oct. 28, 2020

(65) Prior Publication Data

US 2021/0041560 A1 Feb. 11, 2021

Related U.S. Application Data

(63) Continuation of application No. PCT/CN2018/085114, filed on Apr. 28, 2018.

(51) Int. Cl.
*G01S 17/10* (2020.01)
*G01S 7/481* (2006.01)
(Continued)

(52) U.S. Cl.
CPC ............ *G01S 17/10* (2013.01); *G01S 7/4811* (2013.01); *G01S 17/89* (2013.01); *G02B 5/20* (2013.01)

(58) Field of Classification Search
CPC ........ G01S 17/10; G01S 7/4811; G01S 17/89; G02B 5/20
See application file for complete search history.

(56) References Cited

U.S. PATENT DOCUMENTS

| 6,099,124 A * | 8/2000 | Hidaji | A61B 3/113 351/209 |
| 6,185,043 B1 * | 2/2001 | Imamura | G02B 1/105 359/566 |

(Continued)

FOREIGN PATENT DOCUMENTS

| CN | 1967285 A | 5/2007 |
| CN | 201497810 U | 6/2010 |

(Continued)

OTHER PUBLICATIONS

International Search Report of PCT/CN2018/085114 (Jan. 30, 2019).

*Primary Examiner* — Isam A Alsomiri
*Assistant Examiner* — Joseph C Fritchman
(74) *Attorney, Agent, or Firm* — FIDELI LAW PLLC

(57) ABSTRACT

This application discloses distance detection apparatuses. The distance detection apparatus includes a light source, a transmitting and receiving lens, a detector, and an optical path change element. The light source is to emit a beam. The transmitting and receiving lens is to collimate the beam emitted by the light source, and converge at least a part of return light of the beam reflected by a to-be-detected object. The detector is placed with the light source on a same side of the transmitting and receiving lens, to convert at least a part of return light that passes through the transmitting and receiving lens into an electrical signal. The optical path change element is to change an optical path of the beam emitted by the light source or the return light that passes through the transmitting and receiving lens.

20 Claims, 14 Drawing Sheets

(51) Int. Cl.
    *G01S 17/89*     (2020.01)
    *G02B 5/20*     (2006.01)

(56) References Cited

U.S. PATENT DOCUMENTS

| | | | | |
|---|---|---|---|---|
| 6,411,371 | B1* | 6/2002 | Hinderling | G01S 7/4812 |
| | | | | 356/5.1 |
| 2005/0024625 | A1* | 2/2005 | Mori | G01S 17/42 |
| | | | | 356/4.01 |
| 2010/0068542 | A1* | 3/2010 | Bright | C23C 16/455 |
| | | | | 428/480 |
| 2013/0308118 | A1* | 11/2013 | Hsu | G01S 7/4813 |
| | | | | 356/4.01 |
| 2018/0215239 | A1* | 8/2018 | Maeta | G03B 17/56 |

FOREIGN PATENT DOCUMENTS

| | | |
|---|---|---|
| CN | 204044359 U | 12/2014 |
| CN | 105116557 A | 12/2015 |
| CN | 106019296 A | 10/2016 |
| CN | 107015237 A | 8/2017 |
| CN | 206684293 U | 11/2017 |
| CN | 206960659 U | 2/2018 |
| JP | H1020021 A | 1/1998 |
| JP | 2001349943 A | 12/2001 |
| JP | 2007218807 A | 8/2007 |
| PL | 204520 B1 | 1/2017 |
| PL | 224520 B1 * | 1/2017 |
| WO | WO2018006699 A1 | 1/2018 |

\* cited by examiner

DISTANCE DETECTION APPARATUSES

RELATED APPLICATIONS

The present patent document is a continuation of PCT Application Serial No. PCT/CN2018/085114, filed on Apr. 28, 2018, designating the United States and published in Chinese, which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Technical Field

This application relates to the optical detection field, and in particular, to distance detection apparatuses.

2. Background Information

A distance detection apparatus plays an important role in many fields. For example, it may be used on a mobile carrier or a stationary carrier, and used for remote sensing, obstacle avoidance, surveying and mapping, and modeling. In particular, a mobile carrier, for example, a robot, a manned aircraft, an unmanned aircraft, a vehicle, or a ship, may be navigated in a complex environment by using a distance detection apparatus, to implement path planning, obstacle detection, obstacle avoidance, and the like. Miniaturization of a distance detection apparatus is always an issue worthy of discussion and research. A miniaturized distance detection apparatus can be carried more conveniently, especially for a mobile carrier, and is also advantageous to carrier miniaturization.

BRIEF SUMMARY

The present application provides a miniaturized distance detection apparatus, which uses the same transmitting and receiving lens for light emission and return light reception, thereby improving the compactness and miniaturization of the structure of the distance detection apparatus.

Embodiments of the present application provides a distance detection apparatus. The distance detection apparatus comprises: a light source to emit a beam; a transmitting and receiving lens to collimate the beam emitted by the light source, and converge and/or focus at least a part of return light reflected by a to-be-detected object; a detector placed with the light source on a same side of the transmitting and receiving lens to convert the at least a part of return light that passes through the transmitting and receiving lens into an electrical signal, to measure a distance between the to-be-detected object and the distance detection apparatus; and an optical path change element placed with the light source and the detector on the same side of the transmitting and receiving lens to change an optical path of the beam emitted by the light source or an optical path of the return light that passes through the transmitting and receiving lens.

In some embodiments, one of the detector and the light source is placed on a focal plane of the transmitting and receiving lens, and the other one of the detector and the light source is placed on one side of an optical axis of the transmitting and receiving lens.

In some embodiments, a distance from the light source to the optical path change element is equal to a distance from the detector to the optical path change element.

In some embodiments, the detector is placed on the focal plane of the transmitting and receiving lens, and the light source is placed on one side of the optical axis of the transmitting and receiving lens.

In some embodiments, the optical path change element deviates from the optical axis of the transmitting and receiving lens, and to project, to the transmitting and receiving lens, the beam emitted by the light source.

In some embodiments, the optical path change element is located on one side of the optical axis of the transmitting and receiving lens, close to the light source.

In some embodiments, the light source is placed on the focal plane of the transmitting and receiving lens, and the detector is placed on one side of the optical axis of the transmitting and receiving lens.

In some embodiments, the optical path change element is placed between the transmitting and receiving lens and the light source to allow the beam emitted by the light source to pass, and to project, to the detector, the return light that passes through the transmitting and receiving lens.

In some embodiments, the optical path change element comprises a reflector.

In some embodiments, the optical path change element comprises a prism.

In some embodiments, a central axis of the light source is vertical to a central axis of the detector.

In some embodiments, the distance detection apparatus further comprises: a lens supporter to support the transmitting and receiving lens; a light source focusing member to support the light source; and a detector supporter to support the detector, wherein the light source focusing member and the detector supporter are assembled in the lens supporter.

In some embodiments, the transmitting and receiving lens is mounted at one end of the lens supporter, one of the light source focusing member and the detector supporter is mounted at the other end of the lens supporter opposite to the transmitting and receiving lens, and the other one of the light source focusing member and the detector supporter is mounted at a lateral edge of the lens supporter.

In some embodiments, the detector supporter is mounted at the other end opposite to the transmitting and receiving lens in the lens supporter, and the light source focusing member is mounted at the lateral edge of the lens supporter.

In some embodiments, the distance detection apparatus further comprises: optical path change element supporter to support the optical path change element, wherein the optical path change element supporter extends into the lens supporter, and the optical path change element is located in the lens supporter.

In some embodiments, the optical path change element supporter is fixed at the lateral edge of the lens supporter at which the light source focusing member is mounted, and extends into the lens supporter from the lateral edge of the lens supporter.

In some embodiments, the optical path change element supporter includes a cantilever that extends into the lens supporter, and the optical path change element is mounted at a free end of the cantilever.

In some embodiments, the detector supporter comprises a first focusing member mounted on the lens supporter and a second focusing member mounted on the first focusing member, and the detector is mounted on the second focusing member.

In some embodiments, a sidewall of the first focusing member is parallel to a central axis of the detector and abuts a sidewall of the lens supporter, and the second focusing member extends in a plane vertical to the central axis of the detector.

In some embodiments, the light source focusing member is to adjust a location of the light source in a z-axis direction of the light source, and the detector supporter is to adjust a location of the detector in a z-axis direction, an x-axis direction, and a y-axis direction of the detector.

In some embodiments, the distance detection apparatus includes a plurality of light sources, a plurality of detectors corresponding to the light sources, and a plurality of optical path change elements corresponding to the light sources and the detectors.

In some embodiments, the distance detection apparatus includes a sweeping module placed on one side of the transmitting and receiving lens opposite to the light source and a window located on one side of the sweeping module opposite to the transmitting and receiving lens, wherein the sweeping module is to project, to an external environment, the collimated beam that passes through the transmitting and receiving lens, and project the return light to the transmitting and receiving lens.

In some embodiments, the distance detection apparatus comprises a bandpass filter disposed on a receiving optical path for receiving the return light, and a refractive index of the bandpass filter is greater than or equal to 1.8.

In some embodiments, the bandpass filter includes a bandpass filter placed between the detector and the transmitting and receiving lens.

In some embodiments, the bandpass filter comprises a bandpass filter film coated on a lens of the detector.

In some embodiments, the bandpass filter comprises a bandpass filter film coated on at least one surface of the transmitting and receiving lens, the sweeping module, and the window.

In some embodiments, the bandpass filter includes a long-wavelength pass film coated on one surface of each of the transmitting and receiving lens, the sweeping module, and the window, and a short-wavelength pass film coated on another surface of each of the transmitting and receiving lens, the sweeping module, and the window.

In some embodiments, the sweeping module includes a first optical element and a driver connected to the first optical element, wherein the driver is to drive the first optical element to rotate around a rotation axis, so that the first optical element changes a direction of the collimated beam.

In some embodiments, the first optical element includes a pair of surfaces that are opposite and non-parallel to each other.

In some embodiments, the first optical element includes a wedge prism.

In some embodiments, the first optical element is coated with an anti reflective film.

In some embodiments, a clump weight is disposed on one side of the sweeping module, the clump weight is located on an aperture of the sweeping module, and a flare formed by the beam projected by the optical path change element deviates from the clump weight.

In some embodiments, a clump weight is disposed on one side of the sweeping module, the clump weight is located outside an aperture of the sweeping module, the optical path change element deviates from an optical axis of the transmitting and receiving lens, and a flare formed by the beam projected by the optical path change element is located at an edge of the sweeping module.

In some embodiments, the sweeping module includes a second optical element, the second optical element rotates around the rotation axis, and a rotation speed of the second optical element is different from a rotation speed of the first optical element.

In some embodiments, the second optical element includes a pair of surfaces that are opposite and non-parallel to each other.

In some embodiments, the second optical element includes a wedge prism.

In some embodiments, the second optical element is coated with an antireflective film.

In some embodiments, the window is coated with a long-wavelength pass film.

In some embodiments, at least one of an inner surface of the window, a surface of the sweeping module, a surface of the transmitting and receiving lens, a surface of the optical path change element, or a surface of a lens of the detector is coated with a hydrophilic film.

In some embodiments, the transmitting and receiving lens is coated with an antireflective film.

In some embodiments, the distance detection apparatus further comprises a light source supporter for supporting the light source, wherein the light source supporter and the light source focusing member are fixed to each other, and the light source supporter is to adjust a distance between the light source and the transmitting and receiving lens.

The transmitting and receiving lens may collimate the beam emitted by the light source, and may focus the return light; and the optical path change element may change the optical path of the beam emitted by the light source or the optical path of the return light, so that the same transmitting and receiving lens can be used for light emission and return light reception. Therefore, a structure of the distance detection apparatus is more compact and more miniaturized.

BRIEF DESCRIPTION OF THE DRAWINGS

To describe the technical solutions in the embodiments of the present application or in the conventional techniques more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION OF THE DRAWINGS

Figure 1:
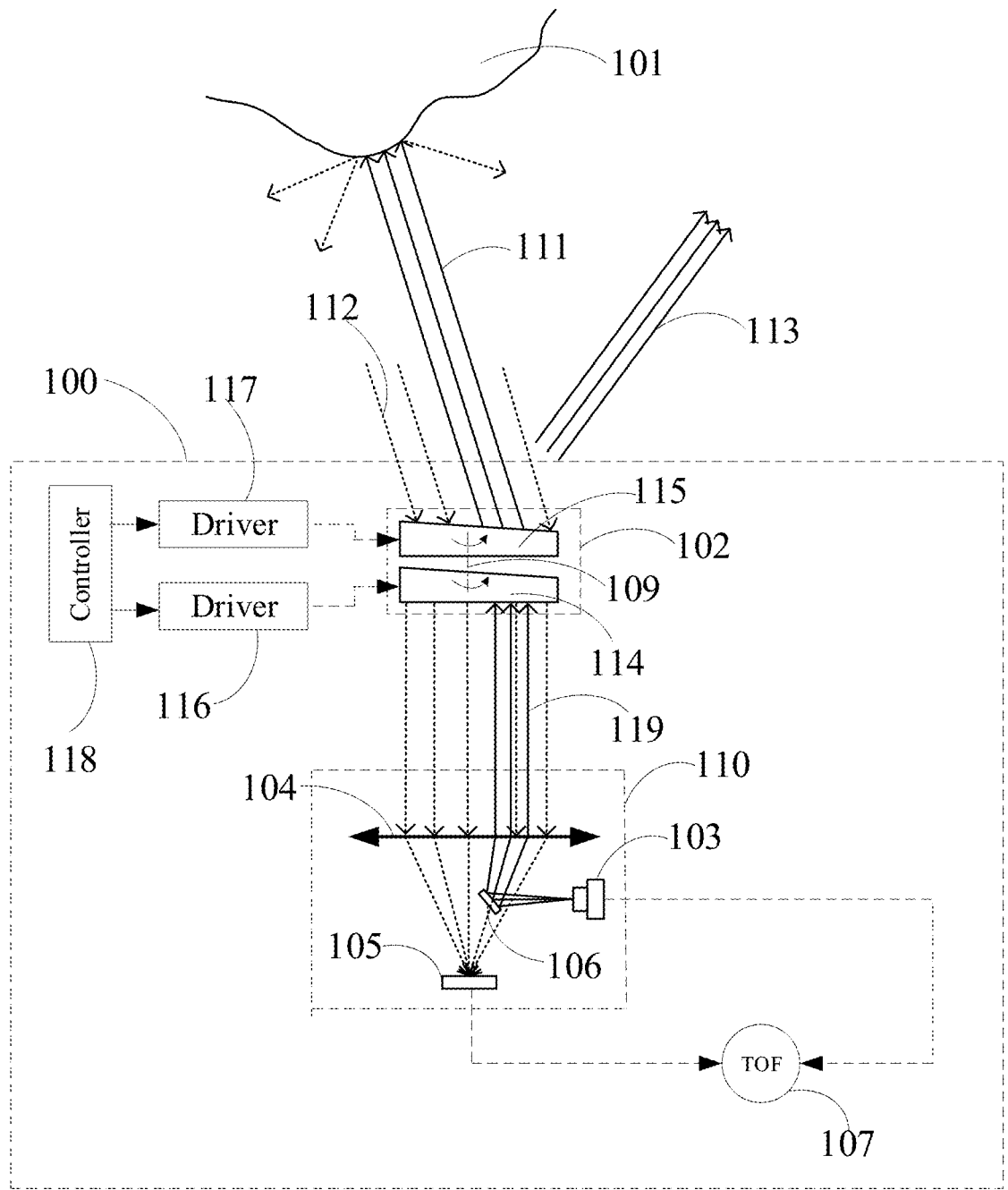
FIG. 1 is a schematic view illustrating a distance detection apparatus according to embodiments of the present application.

The following description provides specific application scenarios and requirements of the present application in order to enable those skilled in the art to make and use the present application. Various modifications to the disclosed embodiments will be apparent to those skilled in the art. The general principles defined herein may be applied to other embodiments and applications without departing from the spirit and scope of the disclosure. Therefore, the present disclosure is not limited to the embodiments shown, but the broadest scope consistent with the claims.

The terminology used herein is for the purpose of describing particular exemplary embodiments only and is not intended to be limiting. When used in this disclosure, the terms "comprises", "comprising", "includes" and/or "including" refer to the presence of stated features, integers, steps, operations, elements, and/or components, but do not preclude the presence or addition of one or more other features, integers, steps, operations, elements, components, and/or groups thereof. As used in this disclosure, the term "A on B" means that A is directly adjacent to B (from above or below), and may also mean that A is indirectly adjacent to B (i.e., there is some element between A and B); the term "A in B" means that A is all in B, or it may also mean that A is partially in B.

In view of the following description, these and other features of the present disclosure, as well as operations and functions of related elements of the structure, and the economic efficiency of the combination and manufacture of the components, may be significantly improved. All of these form part of the present disclosure with reference to the drawings. However, it should be clearly understood that the drawings are only for the purpose of illustration and description, and are not intended to limit the scope of the present disclosure. It is also understood that the drawings are not drawn to scale.

In some embodiments, numbers expressing quantities or properties used to describe or define the embodiments of the present application should be understood as being modified by the terms "about", "generally", "approximate," or "substantially" in some instances. For example, "about", "generally", "approximately" or "substantially" may mean a ±20% change in the described value unless otherwise stated. Accordingly, in some embodiments, the numerical parameters set forth in the written description and the appended claims are approximations, which may vary depending upon the desired properties sought to be obtained in a particular embodiment. In some embodiments, numerical parameters should be interpreted in accordance with the value of the parameters and by applying ordinary rounding techniques. Although a number of embodiments of the present application provide a broad range of numerical ranges and parameters that are approximations, the values in the specific examples are as accurate as possible.

Each of the patents, patent applications, patent application publications, and other materials, such as articles, books, instructions, publications, documents, products, etc., cited herein are hereby incorporated by reference, which are applicable to all contents used for all purposes, except for any history of prosecution documents associated therewith, or any identical prosecution document history, which may be inconsistent or conflicting with this document, or any such subject matter that may have a restrictive effect on the broadest scope of the claims associated with this document now or later. For example, if there is any inconsistent or conflicting in descriptions, definitions, and/or use of a term associated with this document and descriptions, definitions, and/or use of the term associated with any materials, the term in this document shall prevail.

It should be understood that the embodiments of the application disclosed herein are merely described to illustrate the principles of the embodiments of the application. Other modified embodiments are also within the scope of this application. Therefore, the embodiments disclosed herein are by way of example only and not limitations. Those skilled in the art may adopt alternative configurations to implement the invention in this application in accordance with the embodiments of the present application. Therefore, the embodiments of the present application are not limited to those embodiments that have been precisely described in this disclosure.

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

Exemplary embodiments are described in detail herein, and examples of the exemplary embodiments are presented in the accompanying drawings. When the following description relates to the accompanying drawings, unless otherwise specified, same numbers in different accompanying drawings represent a same or similar element. Implementations described in the following exemplary embodiments do not represent all implementations consistent with this application. On the contrary, they are only examples of apparatuses and methods that are described in the appended claims in detail and are consistent with some aspects of this application.

The terms used in this application are used only for describing specific embodiments, and not intended to limit this application. The terms "a", "said" and "the" of singular forms used in this application and the appended claims are also intended to include plural forms, unless otherwise clearly specified in the context. It should also be understood that, the term "and/or" used in this specification indicates and includes any or all possible combinations of one or more associated listed items. Unless otherwise specified, terms similar to "a front portion", "a rear portion", "a lower portion", and/or "an upper portion", or the like are used only for ease of description, and not intended to limit a location or a spatial direction. Terms similar to "connect", "connected", or the like are not limited to a physical or mechanical connection, but may include an electrical connection, whether directly or indirectly.

A distance detection apparatus in the embodiments of this application may include a light source, a transmitting and receiving lens, a detector, and an optical path change element. The light source may be configured to emit a beam. The transmitting and receiving lens may be configured to collimate the beam emitted by the light source, and converge and/or focus at least a part of return light reflected by a to-be-detected object. The detector may be placed with the light source on a same side of the transmitting and receiving lens, and configured to convert at least a part of return light that passes through the transmitting and receiving lens into an electrical signal. The optical path change element may be placed with the light source and the detector on the same side of the transmitting and receiving lens, and configured to change an optical path of the beam emitted by the light source or an optical path of the return light that passes through the transmitting and receiving lens. The transmitting and receiving lens of the distance detection apparatus in this application may collimate the beam emitted by the light source, and may converge and/or focus the return light; and the optical path change element may change the optical path of the beam emitted by the light source or the optical path of the return light. Therefore, the same transmitting and receiving lens can be used for light emission and return light reception, and a structure of the distance detection apparatus is more compact and more miniaturized. In addition, the lens may be fully used, and costs may be reduced.

The following describes the distance detection apparatus in this application in detail with reference to the accompanying drawings. If there is no conflict, the following embodiments and features in implementations may be mutually combined.

FIG. 1 is a schematic view illustrating embodiments of a distance detection apparatus 100. The distance detection apparatus 100 may be configured to measure a distance and an azimuth from a to-be-detected object 101 to the distance detection apparatus 100. In some embodiments, the distance detection apparatus 100 may include a radar, for example, a laser radar. The distance detection apparatus 100 may detect the distance from the to-be-detected object 101 to the distance detection apparatus 100 by measuring time of light propagation, that is, time of flight (TOF) between the distance detection apparatus 100 and the to-be-detected object 101.

The distance detection apparatus 100 may include an optical transmitting and receiving apparatus 110. The optical transmitting and receiving apparatus 110 may include a light source 103, a transmitting and receiving lens 104, a detector 105, and an optical path change element 106. The optical transmitting and receiving apparatus 110 may be configured to emit a beam, receive return light, and convert the return light into an electrical signal. The light source 103 may be configured to emit the beam. In some embodiments, the light source 103 may emit a laser beam. The laser beam emitted by the light source 103 may be a narrow-bandwidth beam whose wavelength is beyond a range of visible light. The transmitting and receiving lens 104 may be configured to collimate the beam emitted by the light source 103, to collimate the beam emitted by the light source 103, to parallel light 119.

The distance detection apparatus 100 may further include a sweeping module 102. The sweeping module 102 may be placed on one side of the transmitting and receiving lens 104 opposite to the light source 103. The collimated beam 119 may be projected to the sweeping module 102. The sweeping module 102 may be configured to change a transmission direction of the collimated beam 119 that passes through the transmitting and receiving lens 104, and project the collimated beam 119 to an external environment, and project the return light to the transmitting and receiving lens 104. The sweeping module 102 may project the beam to space around the distance detection apparatus 100. In some embodiments, the sweeping module 102 may include one or more optical elements, for example, a lens, a reflector, a prism, an optical grating, an optical phased array, or any combination of the foregoing optical elements. In some embodiments, a plurality of optical elements of the sweeping module 102 may rotate around a common axis 109, and project light to different directions. In some embodiments, a plurality of optical elements of the sweeping module 102 may rotate around different axes. In some embodiments, at least one optical element of the sweeping module 102, for example, a vibrator, may vibrate, to change a propagation direction of light. In some embodiments, a plurality of optical elements of the sweeping module 102 may rotate at different rotation speeds. In some embodiments, a plurality of optical elements of the sweeping module 102 may rotate at a basically same rotation speed.

In some embodiments, the sweeping module 102 includes a first optical element 114 and a driver 116 connected to the first optical element 114, where the driver 116 is configured to drive the first optical element 114 to rotate around the rotation axis 109, so that the first optical element 114 changes the direction of the collimated beam 119. The first optical element 114 projects the collimated beam 119 to different directions. In some embodiments, the first optical element 114 includes a pair of surfaces that are opposite and non-parallel to each other, and the collimated beam 119 passes through the pair of surfaces. In some embodiments, the first optical element 114 includes a wedge prism for refracting the collimated beam 119. In some embodiments, the first optical element 114 is coated with an antireflective film, which can increase intensity of a transmitted beam.

In the embodiments shown in FIG. 1, the sweeping module 102 may include a second optical element 115, where the second optical element 115 may rotate around the rotation axis 109, and a rotation speed of the second optical element 115 may be different from a rotation speed of the first optical element 114. The second optical element 115 may change the direction of the beam projected by the first optical element 114. In some embodiments, the second optical element 115 may be connected to another driver 117, and the driver 117 may drive the second optical element 115 to rotate. The first optical element 114 and the second optical element 115 may be driven by different drivers, so that rotation speeds of the first optical element 114 and the second optical element 115 are different. Therefore, the collimated beam 119 may be projected to different directions in external space, and a large range of space can be swept. In some embodiments, a controller 118 may control the drivers 116 and 117 to respectively drive the first optical element 114 and the second optical element 115. The rotation speeds of the first optical element 114 and the second optical element 115 may be determined based on an area expected to be swept and a pattern in an actual application. The drivers 116 and 117 may include a motor and another driving apparatus.

In some embodiments, the second optical element 115 may include a pair of surfaces that are opposite and non-parallel to each other, and a beam may pass through the pair of surfaces. The second optical element 115 may include a wedge prism. In some embodiments, the second optical element 115 may be coated with an antireflective film, which can increase intensity of a transmitted beam.

Through rotation, the sweeping module 102 may project light to different directions, for example, directions 111 and 113, thereby sweeping the space around the distance detection apparatus 100. When light 111 projected by the sweeping module 102 hits the to-be-detected object 101, a part of light may be reflected by the to-be-detected object 101 along a direction reverse to the projected light 111, to the distance detection apparatus 100. The sweeping module 102 may receive return light 112 reflected by the to-be-detected object 101, and project the return light 112 to the transmitting and receiving lens 104.

The transmitting and receiving lens 104 may converge and/or focus at least a part of the return light 112 reflected by the to-be-detected object 101. In some embodiments, the transmitting and receiving lens 104 may be coated with an antireflective film, which can increase intensity of a transmitted beam. The detector 105 may be placed with the light source 103 on a same side of the transmitting and receiving lens 104, and the detector 105 may be configured to convert at least a part of return light that passes through the transmitting and receiving lens 104 into an electrical signal. In some embodiments, the detector 105 may include an avalanche photodiode, where the avalanche photodiode may be a semiconductor device with high sensitivity, and may convert an optical signal to an electrical signal by using a photocurrent effect.

In some embodiments, the distance detection apparatus 100 may include a measurement circuit, for example, a TOF unit 107, which may be configured to measure TOF, to measure the distance of the to-be-detected object 101. For example, the TOF unit 107 may calculate the distance by using a formula $t=2D/c$, where D indicates the distance between the distance detection apparatus and the to-be-detected object, c indicates a speed of light, and t indicates total time spent on light projection from the distance detection apparatus to the to-be-detected object and returning from the to-be-detected object to the distance detection apparatus. The distance detection apparatus 100 may determine the time t based on a time difference between beam emission by the light source 103 and reception of the return light by the detector 105, and may further determine the distance D. The distance detection apparatus 100 may further detect the azimuth of the to-be-detected object 101 from the distance detection apparatus 100. The distance and azimuth detected by the distance detection apparatus 100 may be used for remote sensing, obstacle avoidance, surveying and mapping, modeling, navigation, or the like.

In some embodiments, the light source 103 may include a laser diode, and emit laser in nanoseconds by using the laser diode. For example, a laser pulse emitted by the light source 103 lasts 10 ns, and duration of a pulse of return light detected by the detector 105 is basically equal to duration of the emitted laser pulse. Further, time of receiving the laser pulse may be determined. For example, rising time of an electrical signal pulse may be detected, and thereby time of receiving a laser pulse may be determined. In some embodiments, multi-stage amplification may be performed on an electrical signal. Therefore, the distance detection apparatus may calculate the TOF by using pulse reception time information and pulse emission time information, and determine the distance from the to-be-detected object 101 to the distance detection apparatus 100.

In the embodiments shown in the figure, the optical path change element 106 may be placed with the light source 103 and the detector 105 on the same side of the transmitting and receiving lens 104, and the optical path change element 106 may be configured to change an optical path of the beam emitted by the light source 103 or an optical path of the return light that passes through the transmitting and receiving lens 104. One of the detector 105 and the light source 103 may be placed on a focal plane of the transmitting and receiving lens 104, and the other one may be placed on one side of an optical axis of the transmitting and receiving lens 104. Herein the "focal plane" may be a plane that passes through a focus of the transmitting and receiving lens 104 and may be vertical to the optical axis of the transmitting and receiving lens 104. In some embodiments, the distance detection apparatus 100 may include one optical path change element 106. In some embodiments, the distance detection apparatus 100 may include a plurality of optical path change elements 106, which change the optical path of the emitted beam or the optical path of the return light for a plurality of times.

The transmitting and receiving lens 104 may collimate the beam emitted by the light source 103, and may converge and/or focus the return light; and the optical path change element 106 may change the optical path of the beam emitted by the light source 103 or the optical path of the return light, so that the same transmitting and receiving lens 104 can be used for light emission and return light reception. Therefore, a structure of the distance detection apparatus 100 may be more compact and more miniaturized. In addition, the lens may be fully used, and costs may be reduced.

In some embodiments, the distance detection apparatus 100 may include a window (not shown in the figure) located on one side of the sweeping module 102 opposite to the transmitting and receiving lens 104, where light projected by the sweeping module 102 may pass through the window and is projected to the external space, and the return light may pass through the window and reach the sweeping module 102. The light source 103, the detector 105, the optical path change element 106, the transmitting and receiving lens 104, and the sweeping module 102 may be packaged in a packaging apparatus, and a window is formed in the packaging apparatus. In some embodiments, the window may include a glass window. In some embodiments, the window may be coated with a long-wavelength pass film. In some embodiments, the long-wavelength pass film may have a low penetration rate for visible light of about 400 nm to 700 nm, and have a high penetration rate for light of a transmit beam band.

In some embodiments, at least one of an inner surface of the window, a surface of the sweeping module 102, a surface of the transmitting and receiving lens 104, a surface of the optical path change element 106, and a surface of a lens of the detector 105 may be coated with a water-affinitive film. The water-affinitive film may be a hydrophilic film. Oil volatilized during heating of the distance detection apparatus 100 may spread evenly on a surface of the water-affinitive film. This may avoid forming oil drops on the surface of the optical element, and avoid adverse impact of the oil drops on light propagation. In some embodiments, surfaces of other optical elements of the distance detection apparatus 100 may be coated with water-affinitive films. In the embodiments shown in FIG. 1, the two surfaces of the first optical element 114 that are opposite and non-parallel to each other and the two surfaces of the second optical element 115 that are opposite and non-parallel to each other in the sweeping module 102 may be coated with water-affinitive films.

Figure 2:
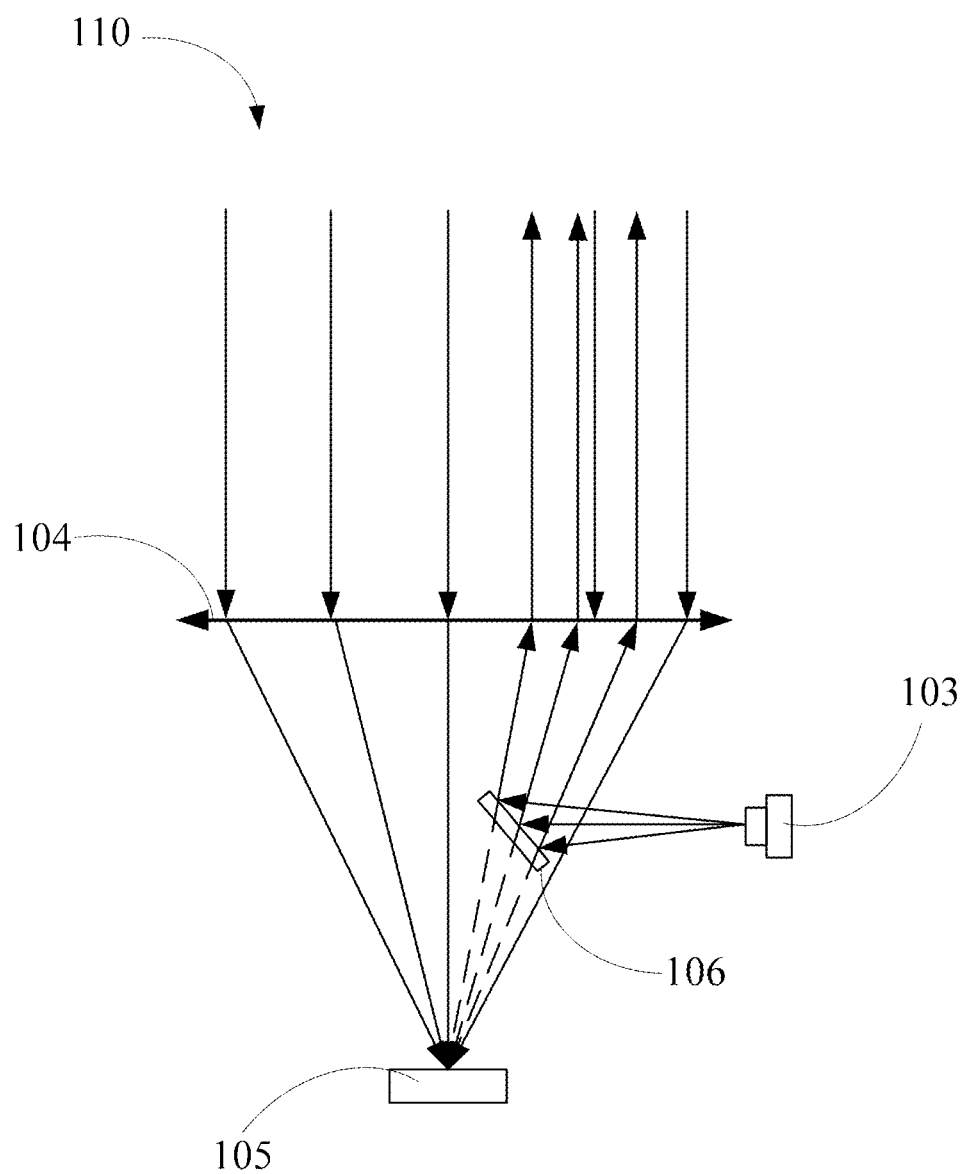
FIG. 2 is an enlarged view illustrating an optical transmitting and receiving apparatus of a distance detection apparatus shown in FIG. 1.

FIG. 2 is an enlarged view illustrating the optical transmitting and receiving apparatus 110 shown in FIG. 1. In the embodiments shown in FIG. 2, the optical path change element 106 may change the optical path of the beam emitted by the light source 103. The detector 105 may be placed on the focal plane of the transmitting and receiving lens 104, and the light source 103 may be placed on one side of the optical axis of the transmitting and receiving lens 104. The light source 103 may deviate to one side relative to the transmitting and receiving lens 104. The beam emitted by the light source 103 may be projected to the optical path change element 106, and the optical path change element 106 may project, to the transmitting and receiving lens 104, the beam emitted by the light source 103. In some embodiments, the optical path change element 106 may deviate from the optical axis of the transmitting and receiving lens 104. This may reduce blocking of the optical path of the return light by the optical path change element 106 as much as possible. In some embodiments, the optical path change element 106 may be located on one side of the optical axis of the transmitting and receiving lens 104, close to the light source 103. In some embodiments, the optical path change element 106 may be located on one side of the optical axis of the transmitting and receiving lens 104, far away from the light source 103.

In some embodiments, a clump weight (not shown in the figure) may be disposed on one side of the sweeping module 102, and a flare formed by the beam projected by the optical path change element 106 may deviate from the clump weight. At least one of the first optical element 114 and the second optical element 115 has an asymmetric structure, and the clump weight may enable the sweeping module 102 to keep balance in a rotation process. The clump weight may be located on an aperture of the sweeping module 102, and may be located at an edge of the sweeping module 102. A location of the optical path change element 106 may deviate from the transmitting and receiving lens 104 and deviate from the edge of the sweeping module 102, to deviate from the location of the clump weight and prevent the clump weight from blocking light projected by the optical path change element 106.

In some embodiments, the clump weight may be located outside an aperture of the sweeping module 102. For example, the sweeping module 102 may be contained in a hollow portion of a hollow drive motor, and the clump weight may be disposed on a sidewall of the drive motor close to the hollow portion. A groove may be formed on an inner sidewall of the drive motor and may be configured to contain the clump weight. The optical path change element 106 may deviate from the optical axis of the transmitting and receiving lens 104, and the flare formed by the beam projected by the optical path change element 106 may be located at the edge of the sweeping module 102. Therefore, the optical path may be least blocked by the optical path change element 106, and light projected by the optical path change element 106 may be not blocked by the clump weight.

In some embodiments, the optical path change element 106 may reflect the beam emitted by the light source 103. In the embodiments shown in FIG. 2, the optical path change element 106 may include a reflector. In some embodiments, a central axis of the light source 103 may be vertical to a central axis of the detector 105. An angle of 45° may be formed between a reflection plane of the optical path change element 106 and the central axis of the light source 103, and an angle of 45° may be formed between the reflection plane of the optical path change element 106 and the central axis of the detector 105. The above is merely an example, but the present application is not limited to this example. In some embodiments, the light source 103, the detector 105, and the optical path change element 106 may be further placed in other angles.

A distance from the light source 103 to the optical path change element 106 may be equal to a distance from the detector 105 to the optical path change element 106. Because the detector 105 is placed on the focal plane of the transmitting and receiving lens 104, the distance from the light source 103 to the optical path change element 106 may be approximately equal to a distance from the optical path change element 106 to a focal position of the transmitting and receiving lens 104. The beam emitted by the light source 103 may be equivalent to a beam emitted from the focal location, and an effect of collimating the beam by the transmitting and receiving lens 104 may be good.

In some embodiments, the optical transmitting and receiving apparatus 110 includes one light source 103 and one detector 105. In some embodiments, the optical transmitting and receiving apparatus 110 includes a plurality of light sources 103, a plurality of detectors 105 corresponding to the light sources 103, and a plurality of optical path change elements 106 corresponding to the light sources 103 and the detectors 105, and may emit more light around the distance detection apparatus 100, and receive and detect more return light. Therefore, the location and azimuth of the to-be-detected object 101 can be detected more accurately. In some embodiments, a plurality of light sources 103 may emit different laser pulses. For example, duration of the laser pulses may be different.

The transmitting and receiving lens 104 of the distance detection apparatus 100 in the embodiments of this application may collimate the beam emitted by the light source 103, and may converge and/or focus the return light; and the optical path change element 106 may change the optical path of the beam emitted by the light source 103 or the optical path of the return light, so that the same transmitting and receiving lens 104 can be used for light emission and return light reception. Therefore, the structure of the distance detection apparatus 100 may be more compact and more miniaturized. In addition, the lens 104 may be fully used, and costs may be reduced.

Figure 3:
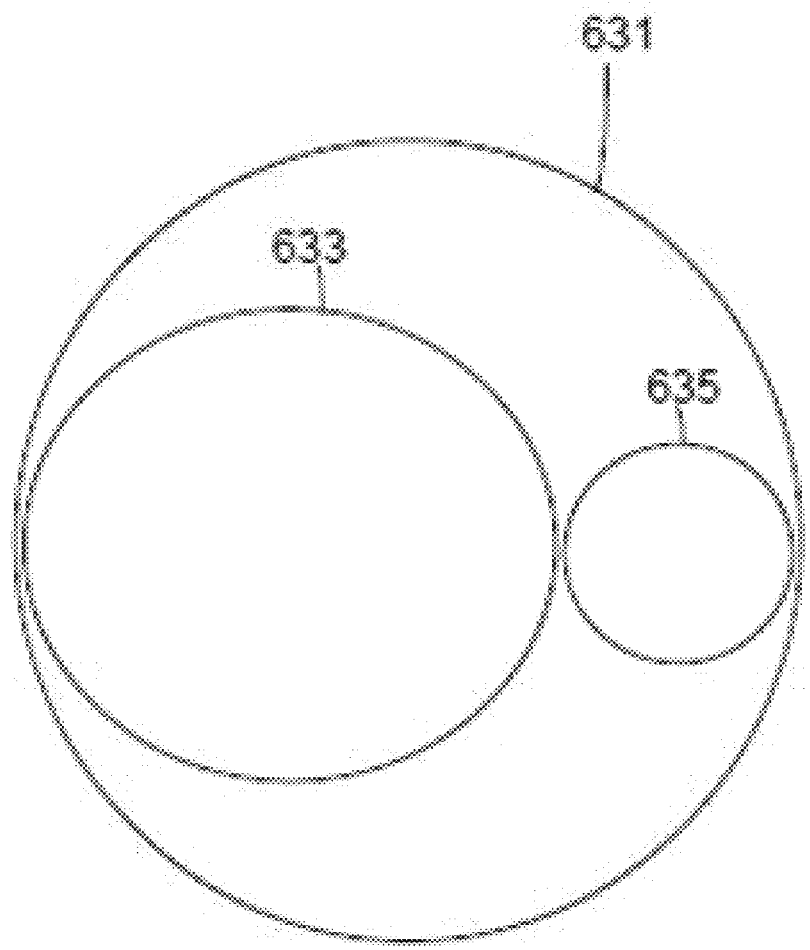
FIG. 3 is a schematic view illustrating apertures of a transmitting collimation lens, a receiving collimation lens, and a sweeping module according to embodiments of the present application.

In some embodiments in which a collimation lens is not shared by a transmitting optical path and a receiving optical path, that is, a transmitting collimation lens is used in the transmitting optical path and a receiving collimation lens is used in the receiving optical path, because among beams emitted by the light source, only a beam that passes through the sweeping module 102 can be used, and a beam that can be received by a receiver is also return light that passes through the sweeping module 102, apertures of an emitted beam that passes through the transmitting collimation lens and return light that passes through the receiving collimation lens may be both less than the aperture of the sweeping module 102. To implement miniaturization and avoid space waste, the aperture of the lens may be approximately equal to an aperture of a beam that can pass, and the aperture of the emitted beam and the aperture of the return light may be both located in the aperture of the sweeping module 102. Therefore, a sum of the aperture 635 of the transmitting collimation lens and the aperture 633 of the receiving collimation lens may be not greater than the aperture 631 of the sweeping module 102 (as shown in FIG. 3); or when the beam disperses slightly, a sum of the aperture 635 of the transmitting collimation lens and the aperture 633 of the receiving collimation lens may be slightly greater than the aperture 631 of the sweeping module 102. Therefore, In some embodiments in which a collimation lens is shared by a transmitting optical path and a receiving optical path, an aperture of the receiving collimation lens is greater than the aperture of the receiving collimation lens in the embodiment in which the collimation lens is not shared by the transmitting optical path and the receiving optical path, and the aperture of the receiving collimation lens may be approximately equal to or slightly greater than the aperture 631 of the sweeping module 102, and more return light may be received. Therefore, in the embodiment in which the collimation lens is shared by the transmitting optical path and the receiving optical path, more return light may be detected by the detector 105, and a rate of receiving return light may be higher. Therefore, accuracy of distance measurement may be improved.

Figure 4:
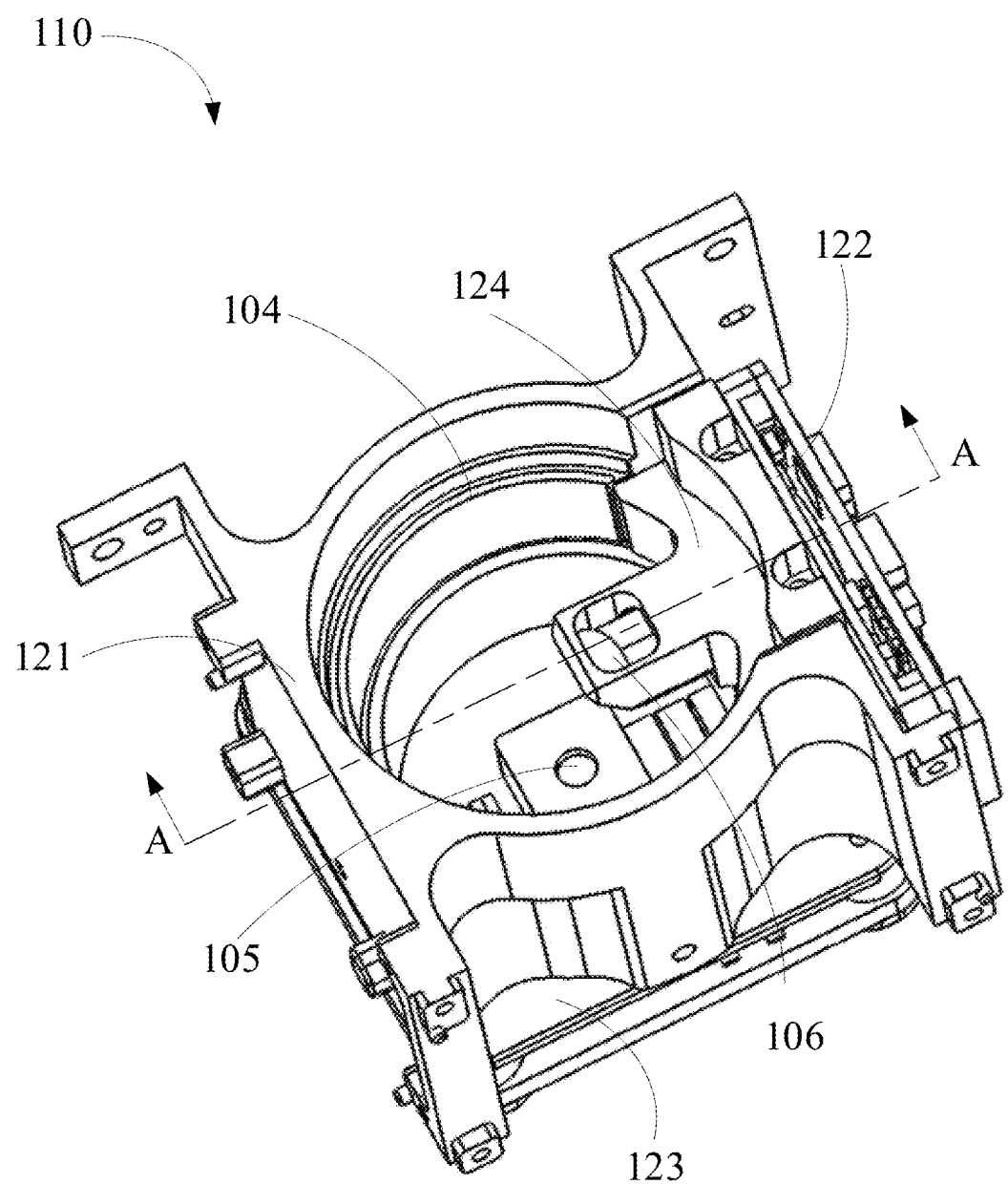
FIG. 4 is a three-dimensional schematic view illustrating a structure of embodiments of an optical transmitting and receiving apparatus shown in FIG. 2.
Figure 5:
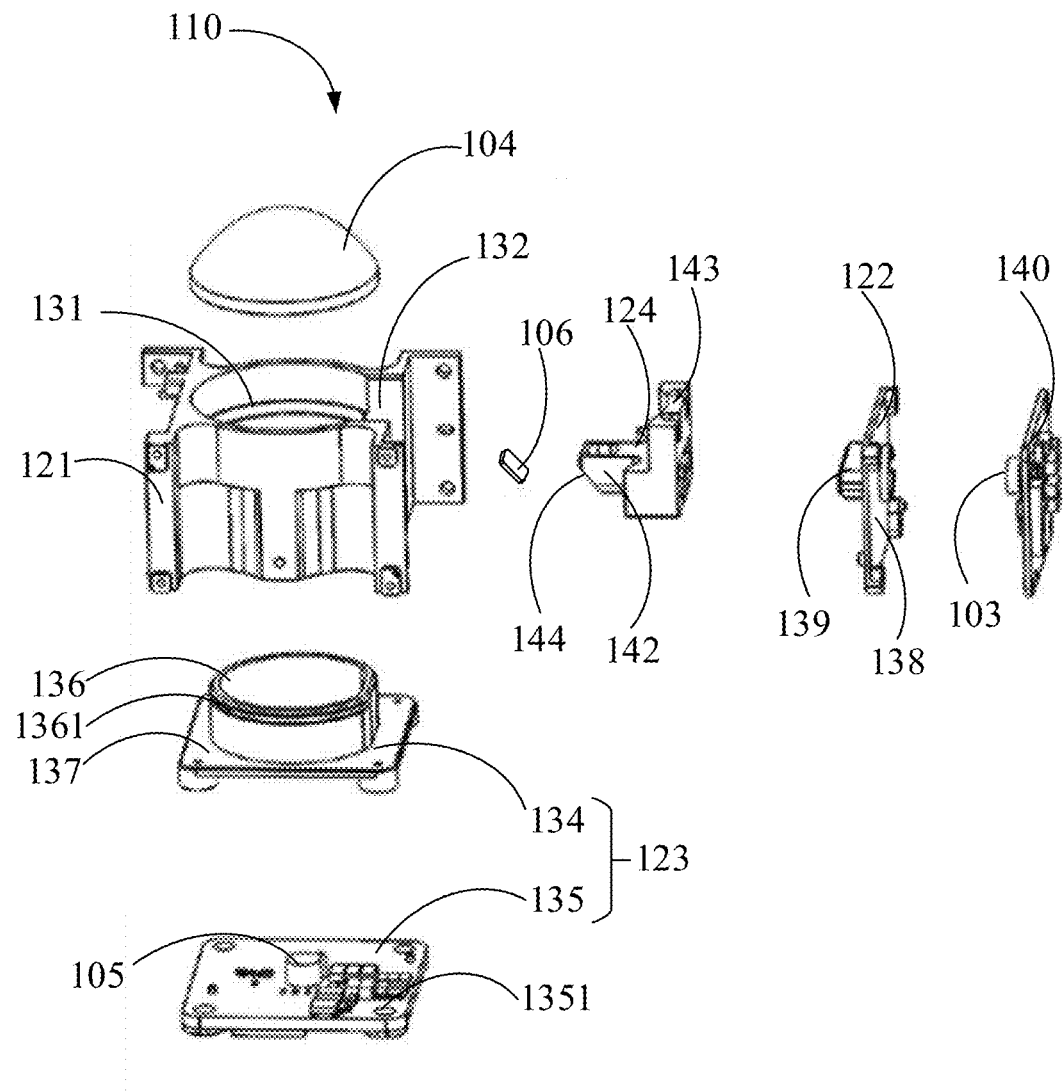
FIG. 5 is a three-dimensional exploded view illustrating an optical transmitting and receiving apparatus shown in FIG. 4.
Figure 6:
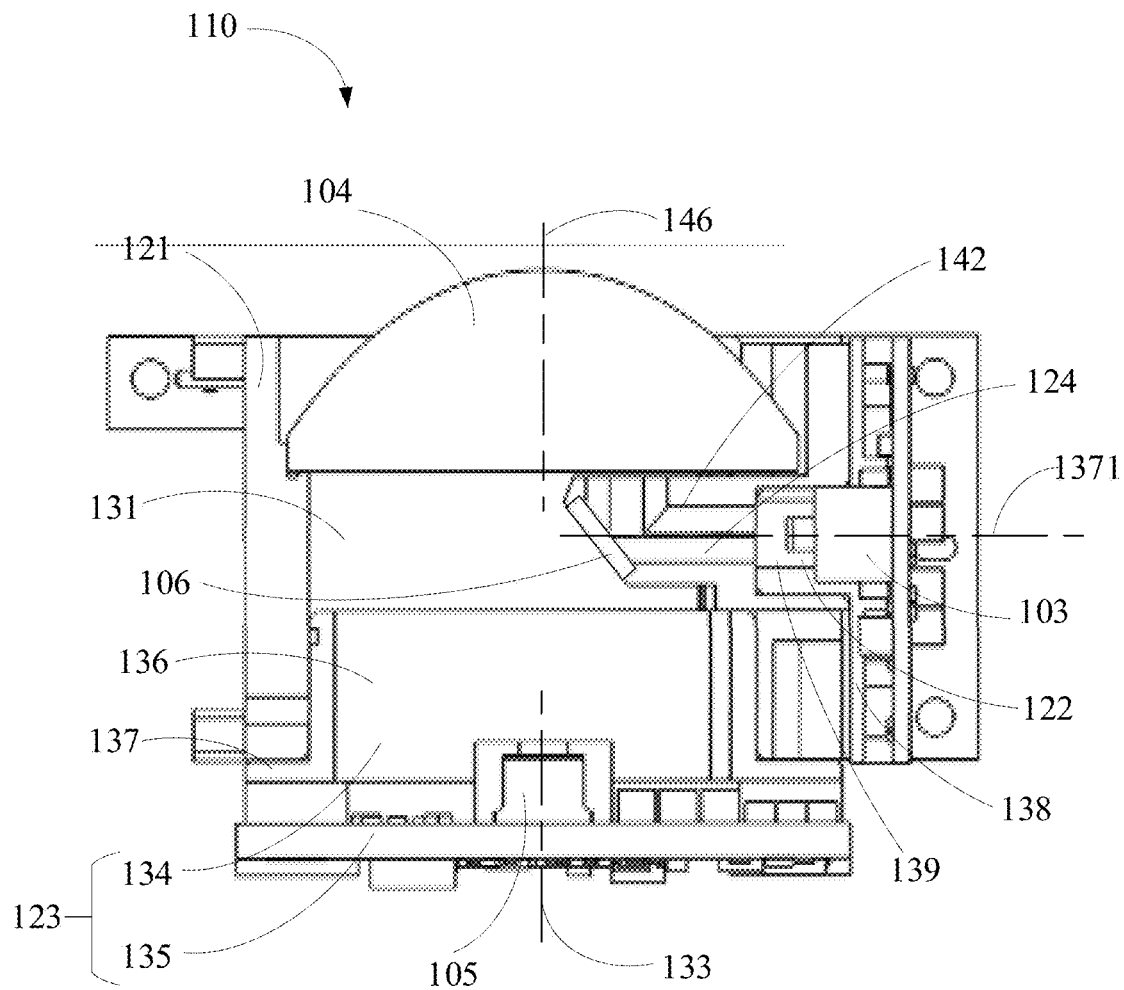
FIG. 6 is a sectional view along an A-A line of an optical transmitting and receiving apparatus shown in FIG. 4.

FIG. 4 is a three-dimensional schematic view illustrating a structure of embodiments of the optical transmitting and receiving apparatus 110 shown in FIG. 2. FIG. 5 is a three-dimensional exploded view illustrating the optical transmitting and receiving apparatus 110 shown in FIG. 4. FIG. 6 is a sectional view along an A-A line of the optical transmitting and receiving apparatus 110 shown in FIG. 4. Referring to FIG. 4 to FIG. 6, the optical transmitting and receiving apparatus 110 may include a lens supporter 121 for supporting the transmitting and receiving lens 104, a light source focusing member 122 for supporting the light source 103, and a detector supporter 123 for supporting the detector 105, where the light source focusing member 122 and the detector supporter 123 may be assembled in the lens supporter 121. The light source focusing member 122 and the detector supporter 123 may move relatively to the lens supporter 121 in an assembling process, to adjust locations of the light source 103 and the detector 105. The light source focusing member 122 may adjust the location of the light source 103 in a z-axis direction (direction of the central axis 1371) of the light source 103. The detector supporter 123 may adjust the location of the detector 105 in a z-axis direction (direction of the central axis 133), an x-axis direction, and a y-axis direction of the detector 105. The x-axis direction and the y-axis direction of the detector 105 may be two directions that are vertical to each other in a plane that supports the detector 105 and may be vertical to the z-axis direction. To be specific, the location of the detector 105 may be adjusted along the central axis direction of the detector 105, or the location of the detector 105 may be adjusted in a plane vertical to the central axis direction. After location adjustment, the light source focusing member 122 and the detector supporter 123 may be fixed on the lens supporter 121, and the locations of the light source 103 and the detector 105 may remain unchanged. The optical transmitting and receiving apparatus 110 may further include an optical path change element supporter 124 for supporting the optical path change element 106. The optical path change element supporter 124 may be assembled in the lens supporter 121.

The lens supporter 121 may have a ring sidewall 131. As shown in FIG. 5, a space with an upper opening and a lower opening for light propagation may be formed by encircling of the sidewall 131. One side of the sidewall 131 may be dented to form a groove 132. Still referring to FIG. 4 to FIG. 6, the transmitting and receiving lens 104 may be mounted at one end of the lens supporter 121. A cover of the transmitting and receiving lens 104 may be disposed on an opening formed at one end of the sidewall 131. In some embodiments, the transmitting and receiving lens 104 may be a convex lens whose surface is a hemisphere, a spherical surface, or a free-form surface, and whose edge may be clamped inside the sidewall 131. An edge of the transmitting and receiving lens 104 is a vertical ring, and fits into the sidewall 131 of the lens supporter 121.

In the embodiments shown in the figure, the detector supporter 123 may be mounted at the other end opposite to the transmitting and receiving lens 104 in the lens supporter 121. A cover of the detector supporter 123 may be disposed on an opening formed at the other end of the sidewall 131 of the lens supporter 121. Return light that passes through the transmitting and receiving lens 104 may propagate in the lens supporter 121 to the detector 105 mounted on the detector supporter 123. In an assembling and debugging process, the location of the detector 105 may be adjusted, so that the detector 105 may be located on the focal plane of the transmitting and receiving lens 104. In some embodiments, moving the detector supporter 123 relative to the lens supporter 121 may cause the detector 105 to move, so that positioning of the detector 105 relative to the transmitting and receiving lens 104 is implemented.

In the assembling and debugging process, the location of the light source 103 may be first adjusted. The location of the light source 103 may be adjusted in the z-axis direction of the light source 103, so that the light source 103 may be located in the focal position of the transmitting and receiving lens 104. If the beam of the light source 103 is projected by the optical path change element 106 to the transmitting and receiving lens 104, the location of the light source 103 may be equivalent to the focal position, that is, a flare formed by a beam that is emitted by the light source 103 and projected by the optical path change element 106 to the transmitting and receiving lens 104 may be consistent with a flare formed by a beam that is emitted from the focal position on the transmitting and receiving lens 104. Then the location of the detector 105 may be adjusted. Through adjustment of the location of the detector 105 in the z-axis direction, the x-axis direction, and the y-axis direction of the detector 105 respectively, the detector 105 may receive most energy of return light.

In some embodiments, the detector supporter 123 may include a first focusing member 134 mounted on the lens supporter 121 and a second focusing member 135 mounted on the first focusing member 134, and the detector 105 may be mounted on the second focusing member 135. The second focusing member 135 may extend in a plane vertical to the central axis 133 of the detector 105, that is, the second focusing member 135 may extend in a plane in which an x-axis and a y-axis of the detector 105 are located. In the embodiments shown in the figure, the second focusing member 135 may include a printed circuit board, electrically connected to the detector 105. The detector 105 may be electrically connected to another circuit element through the printed circuit board. For example, an optical signal may be converted into an electrical signal and provided to an amplification circuit and the TOF unit.

In the assembling and debugging process, the second focusing member 135 may be moved in the x-axis direction and the y-axis direction, and the location of the detector 105 may be adjusted in the x-axis direction and the y-axis direction, so that the detector 105 can maximally receive return light.

After the location of the detector 105 is adjusted in the x-axis direction and the y-axis direction, the second focusing member 135 may be fixed on the first focusing member 134. The second focusing member 135 may be positioned and fixed on the first focusing member 134 by using a fastener (not shown in the figure) such as a screw. In some embodiments, the screw may pass through a focusing hole 1351 of the second focusing member 135 and abut the first focusing member 134, and the first focusing member 134 and the second focusing member 135 may be fixed by friction between the screw and the first focusing member 134. In some embodiments, an aperture of the focusing hole 1351 may be greater than an outer diameter of the screw, and the screw may move in the focusing hole 1351 during focusing. Further, a gap between the focusing hole 1351 and the screw may be filled with gel. After the location of the detector 105 is adjusted in the x-axis direction and the y-axis direction, the gel may be solidified, so that the location of the second focusing member 135 is fixed relatively to the first focusing member 134. In some embodiments, the second focusing member 135 may be mounted at one end of the first focusing member 134 far away from the transmitting and receiving lens 104, and may be fixedly assembled on a fixing portion 137 of the first focusing member 134.

When the location of the detector 105 in the z-axis is adjusted, the location of the detector 105 in the z-axis direction may be adjusted through adjustment of the location of the first focusing member 134 relative to the lens supporter 121. The first focusing member 134 may move along the z-axis direction of the detector 105, and drive the second focusing member 135 to move in the z-axis direction, to adjust the location of the detector 105 in the z-axis direction. In the embodiments shown in the figure, a sidewall 136 of the first focusing member 134 may be parallel to the central axis 133 of the detector 105 and abuts the sidewall 131 of the lens supporter 121. The sidewall 136 of the first focusing member 134 may be ring-shaped, extend into the lens supporter 121, and fit into an inside of the sidewall 131 of the lens supporter 121. The first focusing member 134 may extend out at a bottom of the sidewall 136 of the first focusing member 134 to form the fixing portion 137.

After the adjustment is completed, a fastener such as a screw may penetrate the lens supporter 121, and abut the first focusing member 134 from two opposite sides of the first focusing member 134, so that the first focusing member 134 may be fixed to the lens supporter 121 by friction. In some embodiments, an outside of a top of the sidewall 136 of the first focusing member 134 may be dented to form a groove 1361, and a gap between the groove 1361 and the inside of the sidewall 131 of the lens supporter 121 may be filled with gel. In the adjustment process, the gel may be not solidified, and the first focusing member 134 may be not fixed to the lens supporter 121. After the location of the first focusing member 134 is adjusted properly, the gel may be solidified, and the first focusing member 134 may be fixed more firmly.

In the embodiments shown in FIG. 4 to FIG. 6, the light source focusing member 122 may be mounted at a lateral edge of the lens supporter 121. The light source focusing member 122 may be mounted on an outside of the groove 132 of the sidewall 131 of the lens supporter 121. The light source focusing member 122 may include a fixing plate 138 and a bulge 139 that protrudes on a lateral side of the fixing plate 138. The fixing plate 138 may be fixed on an outside of the sidewall 131 of the lens supporter 121. The bulge 139 may protrude into the groove 132. A light source supporter 140 may be mounted fixedly on a rear side of the fixing plate 138, and the light source 103 may be fixed on the light source supporter 140. The light source supporter 140 may include a printed circuit board, and the light source 103 may be electrically connected to another circuit element through the printed circuit board, for example, electrically connected to the TOF unit. After the fixing plate 138 and the light source supporter 140 are fixed to each other, the light source 103 may be contained in the bulge 139 of the fixing plate 138. The light source supporter 140 may be configured to adjust a distance between the light source 103 and the transmitting and receiving lens 104.

Figure 7:
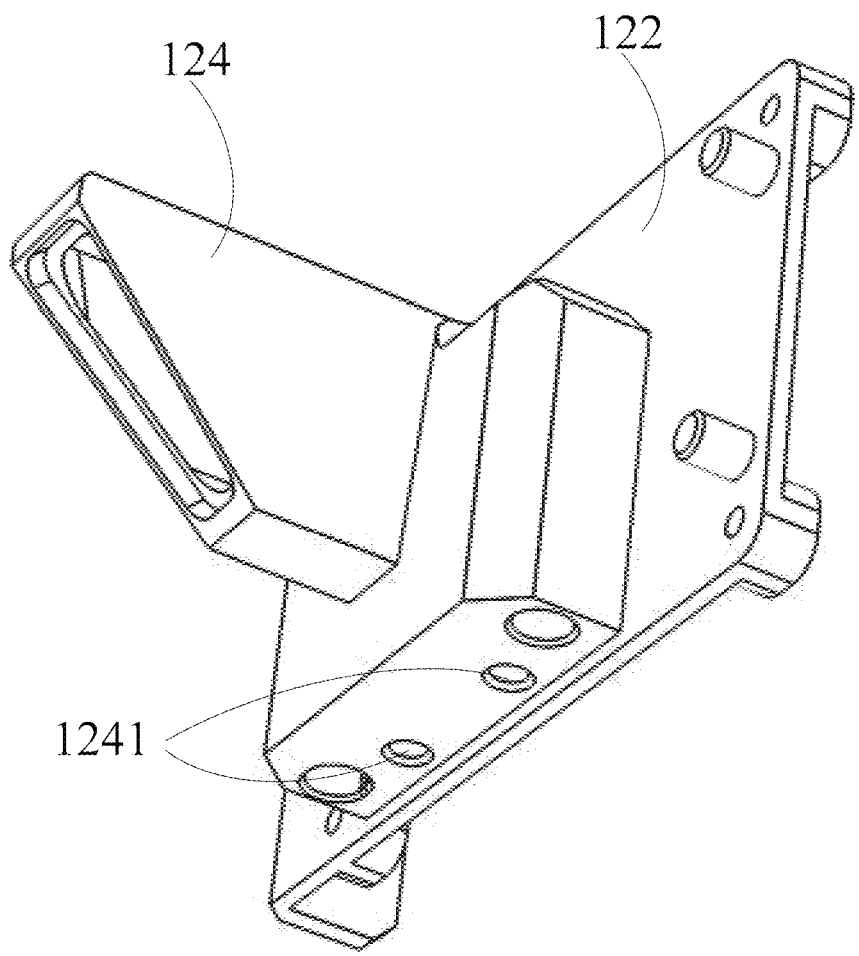
FIG. 7 is a three-dimensional enlarged view illustrating an assembly of a light source focusing member and an optical path change element supporter of an optical transmitting and receiving apparatus shown in FIG. 4.
Figure 8:
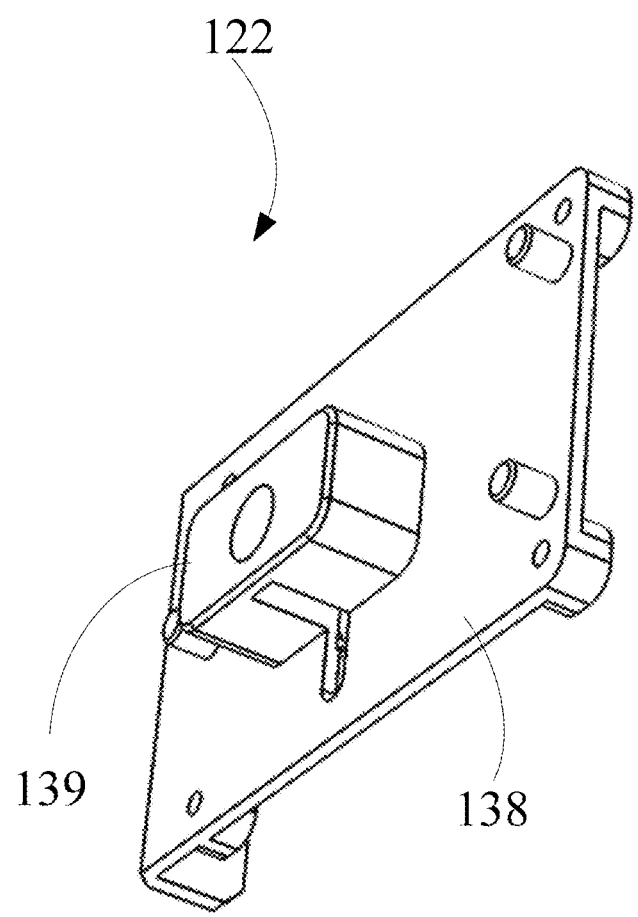
FIG. 8 is a three-dimensional enlarged view illustrating a light source focusing member shown in FIG. 7.

FIG. 7 is a three-dimensional enlarged view illustrating an assembly of the light source focusing member 122 and the optical path change element supporter 124. FIG. 8 is a three-dimensional enlarged view illustrating the light source focusing member 122. With reference to FIG. 7 and FIG. 8, in the assembling and debugging process, the location of the light source 103 in the z-axis direction may be adjusted by moving the light source focusing member 122 in the z-axis direction of the light source 103, so that the light source 103 may be equivalently located at the focus of the transmitting and receiving lens 104.

The bulge 139 may be inserted into the optical path change element supporter 124, and the fixing plate 138 may abut an outside of the optical path change element supporter 124. When the light source focusing member 122 is moved in the z-axis direction of the light source 103, the bulge 139 may move along the z-axis direction in the optical path change element supporter 124. After the location of the light source focusing member 122 is adjusted, a fastener such as a screw may penetrate a fixing hole 1241 of the optical path change element supporter 124 and abut the bulge 139 of the light source focusing member 122, and the light source focusing member 122 may be fixed on the optical path change element supporter 124 by friction.

In some embodiments, the optical path change element supporter 124 may extend into the lens supporter 121, and the optical path change element 106 may be located in the lens supporter 121. The optical path change element supporter 124 may be fixed at the lateral edge of the lens supporter 121 at which the light source focusing member 122 is mounted, and extend into the lens supporter 121 from the lateral edge of the lens supporter 121. The optical path change element supporter 124 and the light source focusing member 122 may be located on a same side of the lens supporter 121. In the embodiments shown in the figure, the optical path change element supporter 124 may extend into the lens supporter 121 from the groove 132 of the lens supporter 121, and support the optical path change element 106 in the lens supporter 121. Due to horizontal run-through of the optical path change element supporter 124, light emitted by the light source 103 may reach the optical path change element 106.

The optical path change element supporter 124 may include a cantilever 142 that extends into the lens supporter 121, and the optical path change element 106 may be mounted at a free end 144 of the cantilever 142. The optical path change element supporter 124 may include a fixed mounting portion 143, and the cantilever 142 may extend from the fixed mounting portion 143. The fixed mounting portion 143 may be fixed and clamped in the groove 132, and the cantilever 142 may extend from the groove 132 into the lens supporter 121. The free end 144 of the cantilever 142 may tilt and extend relatively to a top surface of the cantilever 142, and the optical path change element 106 may be bonded onto the free end 144.

In some embodiments, the optical path change element 106 may be located on one side of the optical axis of the transmitting and receiving lens 104, close to the light source 103. The free end 144 of the cantilever 142 may be located on one side of the optical axis 146 of the transmitting and receiving lens 104, close to the light source 103, so that the optical path change element 106 may be located on one side of the optical axis of the transmitting and receiving lens 104, close to the light source 103. Therefore, an area in which return light is blocked by the cantilever 142 may be small, and most return light may reach the detector 105.

In some embodiments, the cantilever 142 may be hollowed, and vertically through. The cantilever 142 may form several holes that are vertically through. At least a part of return light may pass through the cantilever 142, and blocking of the return light by the cantilever 142 may be reduced. In some embodiments, the cantilever 142 may be made of a transparent material, and may allow transparent transmission of the return light.

The optical transmitting and receiving apparatus 110 may have a compact structure. Taking miniaturization into account, the apparatus may use a transmitting and receiving lens 104 having a large aperture. Therefore, an area in which return light is received by the transmitting and receiving lens 104 may be increased, more return light may be received, and a rate of receiving return light may be higher. Therefore, accuracy of distance measurement may be improved.

Figure 9:
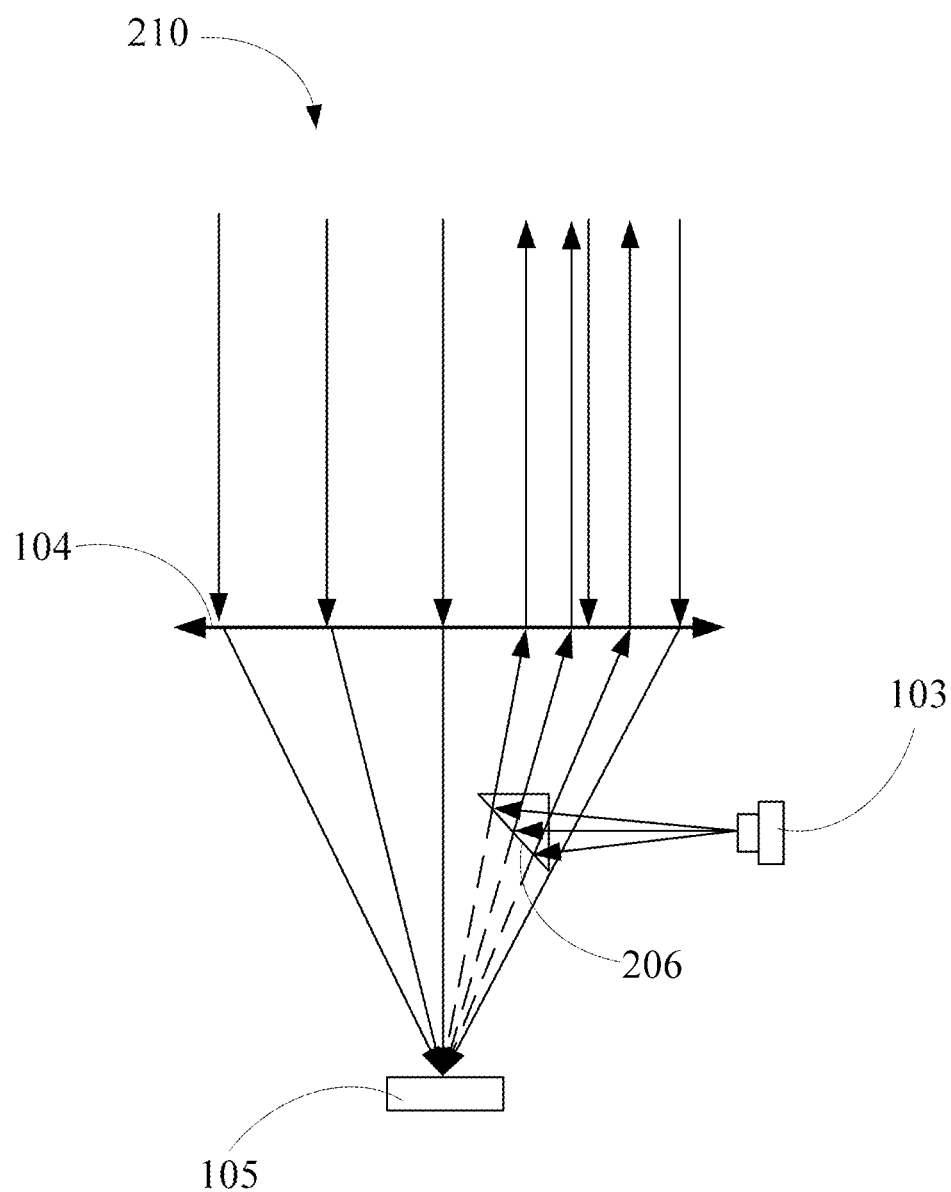
FIG. 9 is a schematic view illustrating an optical transmitting and receiving apparatus of a distance detection apparatus according to embodiments of the present application.

FIG. 9 is a schematic view illustrating embodiments of an optical transmitting and receiving apparatus 210. The optical transmitting and receiving apparatus 210 may be similar to the optical transmitting and receiving apparatus 110 shown in FIG. 1 to FIG. 8. In comparison with the optical transmitting and receiving apparatus 110 shown in FIG. 1 to FIG. 8, an optical path change element 206 of the optical transmitting and receiving apparatus 210 shown in FIG. 9 may include a prism for reflecting a beam emitted by a light source 103. In some embodiments, a cross section of the prism may be an isosceles right triangle, and a cross section of a reflection plane may be a base of a right triangle, but this is not limited.

Figure 10:
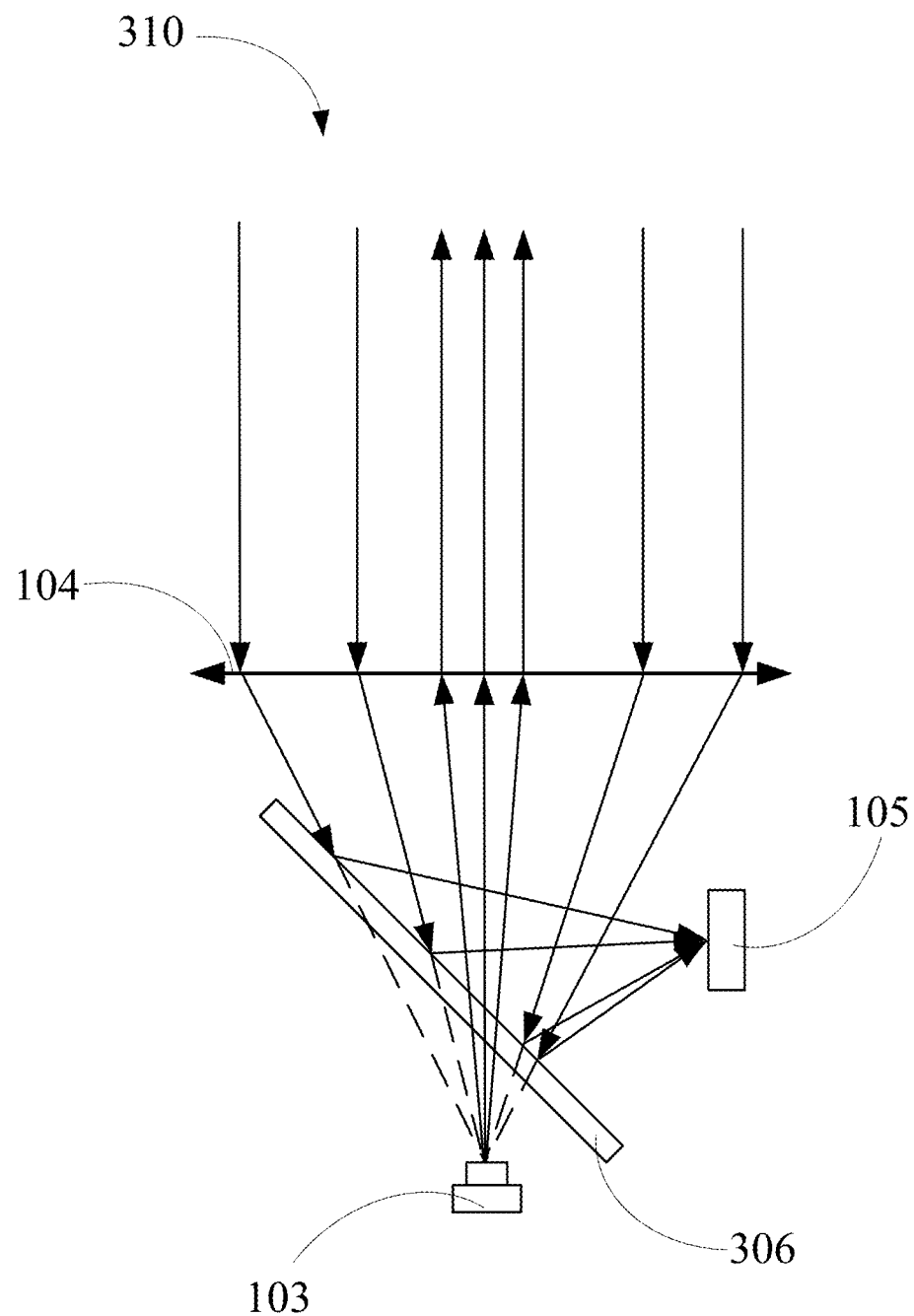
FIG. 10 is a schematic view illustrating an optical transmitting and receiving apparatus of a distance detection apparatus according to embodiments of the present application.

FIG. 10 is a schematic view illustrating embodiments of an optical transmitting and receiving apparatus 310. The optical transmitting and receiving apparatus 310 may be similar to the optical transmitting and receiving apparatus 110 shown in FIG. 1 to FIG. 8. In comparison with the optical transmitting and receiving apparatus 110 shown in FIG. 1 to FIG. 8, a light source 103 of the optical transmitting and receiving apparatus 310 shown in FIG. 10 may be placed on a focal plane of a transmitting and receiving lens 104, and a detector 105 may be placed on one side of an optical axis of the transmitting and receiving lens 104. A distance from the detector 105 to an optical path change element 306 may be equal to a distance from the light source 103 to the optical path change element 306. Because the light source 103 is placed on the focal plane of the transmitting and receiving lens 104, the distance from the detector 105 to the optical path change element 306 may be approximately equal to a distance from the optical path change element 306 to a focal position of the transmitting and receiving lens 104.

The optical path change element 306 may be placed between the transmitting and receiving lens 104 and the light source 103, may allow a beam emitted by the light source 103 to pass, and may be configured to project, to the detector 105, return light that passes through the transmitting and receiving lens 104. In some embodiments, to allow light of the light source 103 to pass, a through hole may be provided in a middle of the optical path change element 306, for example, a reflector or a prism with a central hole. A central axis of the optical path change element 306 may basically overlap the optical axis of the transmitting and receiving lens 104. In some embodiments, the light source 103 may emit polarized light; and the optical path change element 306 may include a polarizer, allowing the polarized light to pass, and reflecting non-polarized return light to the detector 105.

A light source focusing member of the optical transmitting and receiving apparatus 310 In the embodiments shown in FIG. 10 is mounted at one end of a lens supporter opposite to the transmitting and receiving lens 104, and a detector supporter may be mounted at a lateral edge of the lens supporter.

Figure 11:
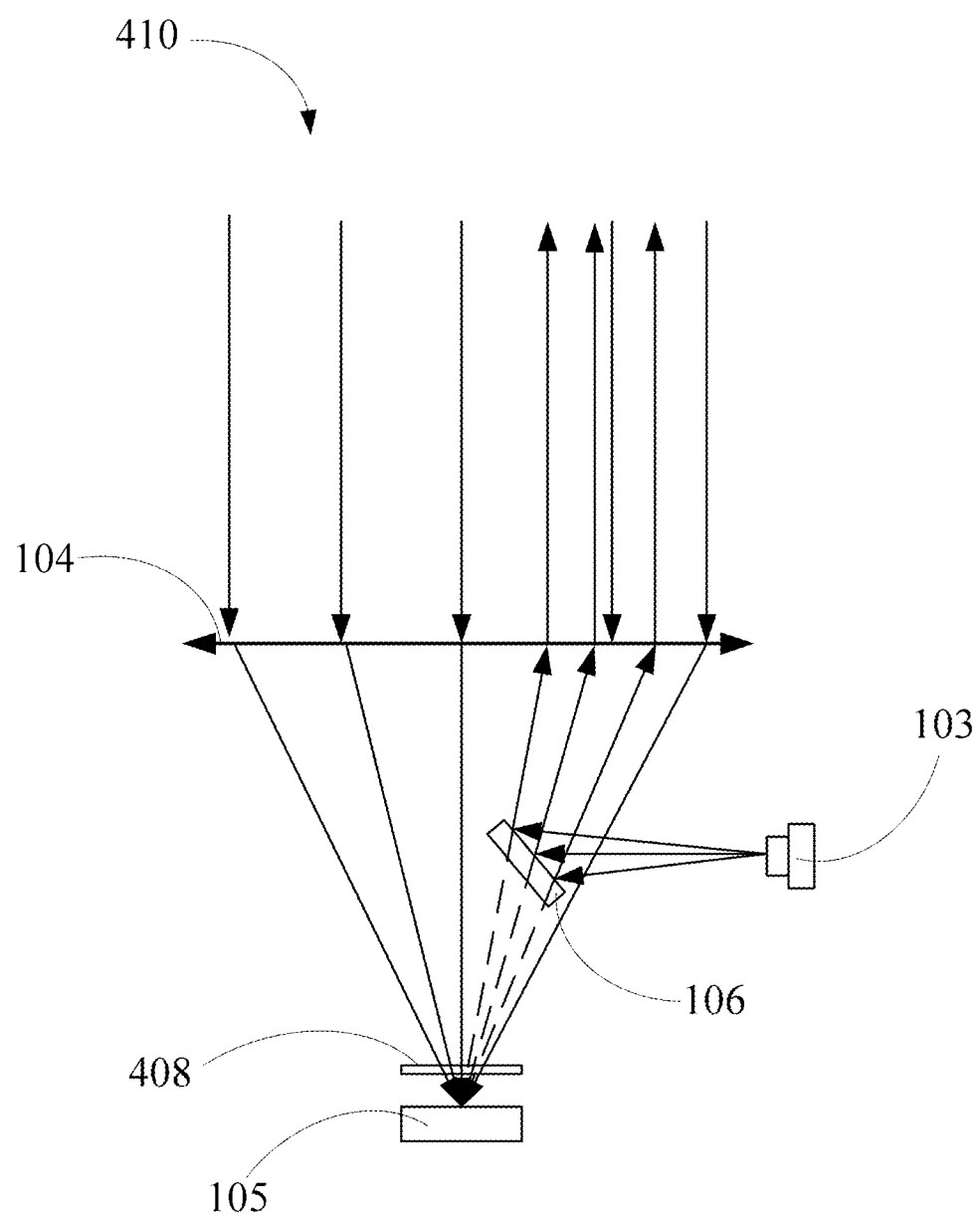
FIG. 11 is a schematic view illustrating an optical transmitting and receiving apparatus of a distance detection apparatus according to embodiments of the present application.

FIG. 11 is a schematic view illustrating embodiments of an optical transmitting and receiving apparatus 410. The optical transmitting and receiving apparatus 410 may be similar to the optical transmitting and receiving apparatus 110 shown in FIG. 1 to FIG. 8. In comparison with the optical transmitting and receiving apparatus 110 shown in FIG. 1 to FIG. 8, the optical transmitting and receiving apparatus 410 shown in FIG. 11 may further include a bandpass filter 408 disposed on a receiving optical path for receiving return light. A bandwidth of the bandpass filter 408 may include a bandwidth of a beam emitted by a light source 103. In some embodiments, the bandwidth of the bandpass filter 408 may be consistent with the bandwidth of the beam emitted by the light source 103. The bandpass filter 408 may filter light beyond the bandwidth of the emitted beam, and may filter at least one part of natural light in the return light to reduce interference of the natural light on detection.

In some embodiments, the bandpass filter 408 may be located between a detector 105 and a transmitting and receiving lens 104. A filtering spectrum of the filter member may drift as an incident angle of an incident beam changes. In some embodiments, to implement miniaturization of the optical transmitting and receiving apparatus 410, a focal distance of the transmitting and receiving lens 104 may be short. Therefore, distances between the light source 103, the detector 105, the transmitting and receiving lens 104, and an optical path change element 106 may be short. However, because the distance between the transmitting and receiving lens 104 and the detector 105 is short, an incident angle of return light converged and/or focused on the detector 105 by the transmitting and receiving lens 104 may change greatly, and a maximum incident angle of the return light may be large. In some embodiments, the bandpass filter 408 may be made of a material with a high refractive index. For example, a refractive index of the bandpass filter 408 may be greater than or equal to 1.8. A filter member with a high refractive index may have low sensitivity to an incident angle of light. For incident light of an incident angle from 0° to about 30°, a spectrum offset may be less than a numeric value (for example, 12 nm). The bandpass filter 408 made of a material with a high refractive index may be placed between the detector 105 and the transmitting and receiving lens 104, so that a proportion of return light reflected by the bandpass filter 408 because the spectrum of the bandpass filter 408 drifts due to a large incident angle of some return light may be reduced.

In the embodiments shown in FIG. 11, a bandpass filter is independent of the detector 105. The bandpass filter 408 may be placed between the detector 105 and the optical path change element 106. Therefore, light emitted by the light source does not need to pass through the bandpass filter, and a loss of emergent light may be avoided. The bandpass filter may be placed near the detector 105. Return light from the transmitting and receiving lens 104 to the detector 105 may be converged and/or focused gradually, and an area illuminated by the return light near the detector 105 may be small. Therefore, a bandpass filter with a small area may be used, which is advantageous to miniaturization. In some embodiments, the bandpass filter 408 may include a bandpass filter film coated on a light receiving surface of the detector 105. The bandpass filter film is used to filter stray light such as natural light.

In some embodiments, the bandpass filter may include a bandpass filter film coated on at least one surface of the transmitting and receiving lens 104, a sweeping module 102, and a window. Because incident angles of return light on the optical element are basically consistent, drifting of the spectrum of the filter member caused by a great range of change of an incident angle of return light on the bandpass filter may be avoided. In some embodiments, a bandpass filter film with a low refractive index may be used.

In some embodiments, the bandpass filter may include a long-wavelength pass film coated on one surface of the transmitting and receiving lens 104, the sweeping module 102, and the window, and a short-wavelength pass film coated on another surface of the transmitting and receiving lens 104, the sweeping module 102, and the window. The long-wavelength pass film and the short-wavelength pass film may have an overlapped band that is allowed to pass. Therefore, the long-wavelength pass film and the short-wavelength pass film may work together to implement bandpass filtering, so that return light consistent with an emergent light band may have a high penetration rate, and light of remaining bands may have a low penetration rate.

The bandpass filter 408 shown in FIG. 11 and the bandpass filter in the foregoing embodiment may also be used in the embodiments shown in FIG. 9 and FIG. 10.

In some embodiments, the focal distance of the transmitting and receiving lens 104 may be long, and when the beam emitted by the light source may be collimated, an angle of divergence of the emitted beam may be small. Therefore, accuracy of distance measurement may be improved. However, the transmitting and receiving lens 104 with a long focal distance may be disadvantageous to miniaturization of a distance detection apparatus 600.

Figure 12:
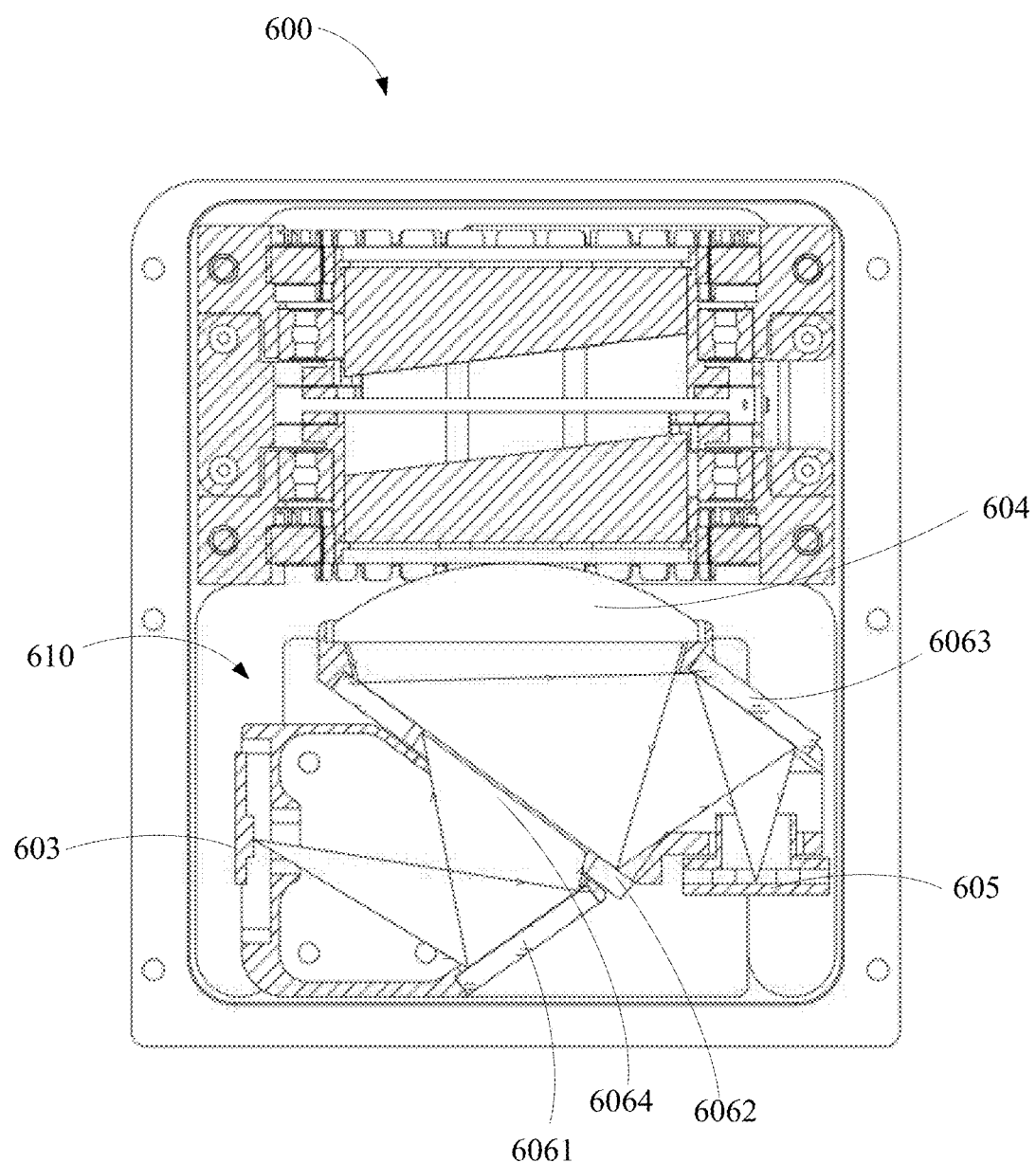
FIG. 12 is a schematic view illustrating a distance detection apparatus according to embodiments of the present application.

FIG. 12 is a schematic view illustrating embodiments of a distance detection apparatus 600. The distance detection apparatus 600 may be similar to the distance detection apparatus 100 shown in FIG. 1 to FIG. 8. In comparison with the embodiment shown in FIG. 1 to FIG. 8, an optical transmitting and receiving apparatus 610 of the distance detection apparatus 600 In the embodiments shown in FIG. 12 may include a plurality of optical path change elements 6061 to 6063 for changing an optical path of a beam emitted by a light source 603 and an optical path of return light. Therefore, a transmitting and receiving lens 604 with a long focal distance may be used. Because the plurality of optical path change elements 6061 to 6063 may be used, the light source 603 and a detector 605 may be equivalently located in a focal position of the transmitting and receiving lens 604. Because the optical path is folded by the optical path change elements 6061 to 6063, a structure of the distance detection apparatus 600 may be compact, and may be advantageous to miniaturization.

The plurality of optical path change elements 6061 to 6063 may include a reflector, a prism, or another optical element that changes an optical path. In the embodiments shown in the figure, the plurality of optical path change elements 6061 to 6063 may include a first optical path change element 6061, a second optical path change element 6062, and a third optical path change element 6063. The light source 603 may be located at a lateral edge of the distance detection apparatus 600. The first optical path change element 6061 may be below the light source 603, and closer to an optical axis of the transmitting and receiving lens 604 than the light source 603. The first optical path change element 6061 may be obliquely placed relatively to the optical axis of the transmitting and receiving lens 604, faces the light source 603 and the transmitting and receiving lens 604, and may project, to the transmitting and receiving lens 604, light emitted by the light source 603. The light source 603 may emit a beam obliquely downward. When the beam reaches the first optical path change element 6061, the first optical path change element 6061 may reflect the beam to a direction of the transmitting and receiving lens 604.

Figure 13:
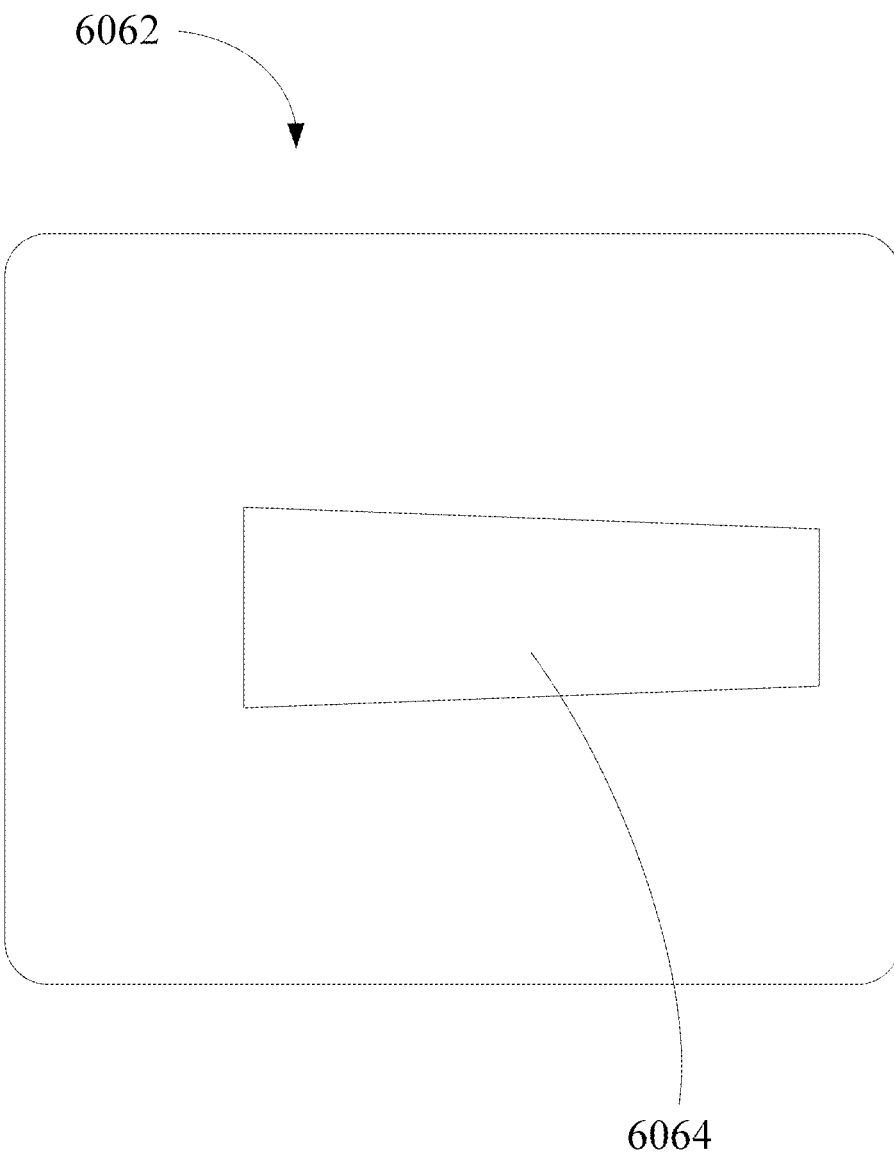
FIG. 13 is a front schematic view illustrating a second optical path change element of a distance detection apparatus shown in FIG. 12.

A through hole 6064 may be formed on the second optical path change element 6062. FIG. 13 is a front schematic view illustrating the second optical path change element 6062. The through hole 6064 may be approximately located in a middle of the second optical path change element 6062. In the embodiments shown in the figure, the through hole 6064 may be in a trapezoid shape. In some embodiments, the through hole 6064 may be in a rectangle shape, a circle shape, or another shape. Still referring to FIG. 12, the second optical path change element 6062 may be located between the first optical path change element 6061 and the transmitting and receiving lens 604, and face the transmitting and receiving lens 604. The optical axis of the transmitting and receiving lens 604 may pass through the through hole 6064. A beam reflected by the first optical path change element 6061 may pass through the through hole 6064 of the second optical path change element 6062, and may be projected to the transmitting and receiving lens 604 and collimated by the transmitting and receiving lens 604.

In the embodiments shown in the figure, the detector 605 may be located at another lateral edge of the distance detection apparatus 600 opposite to the light source 603. Return light passing through the transmitting and receiving lens 604 may pass through the second optical path change element 6062 and the third optical path change element 6063, and may be converged and/or focused on the detector 605. The third optical path change element 6063 may be located on an outside of the transmitting and receiving lens 604, on an upper side of the detector 605, and close to the transmitting and receiving lens 604, and face the second optical path change element 6062 and the detector 605. Return light passing through the transmitting and receiving lens 604 may pass through the second optical path change element 6062 and may be reflected to the third optical path change element 6063, and the third optical path change element 6063 may reflect the return light to the detector 605.

Figure 14:
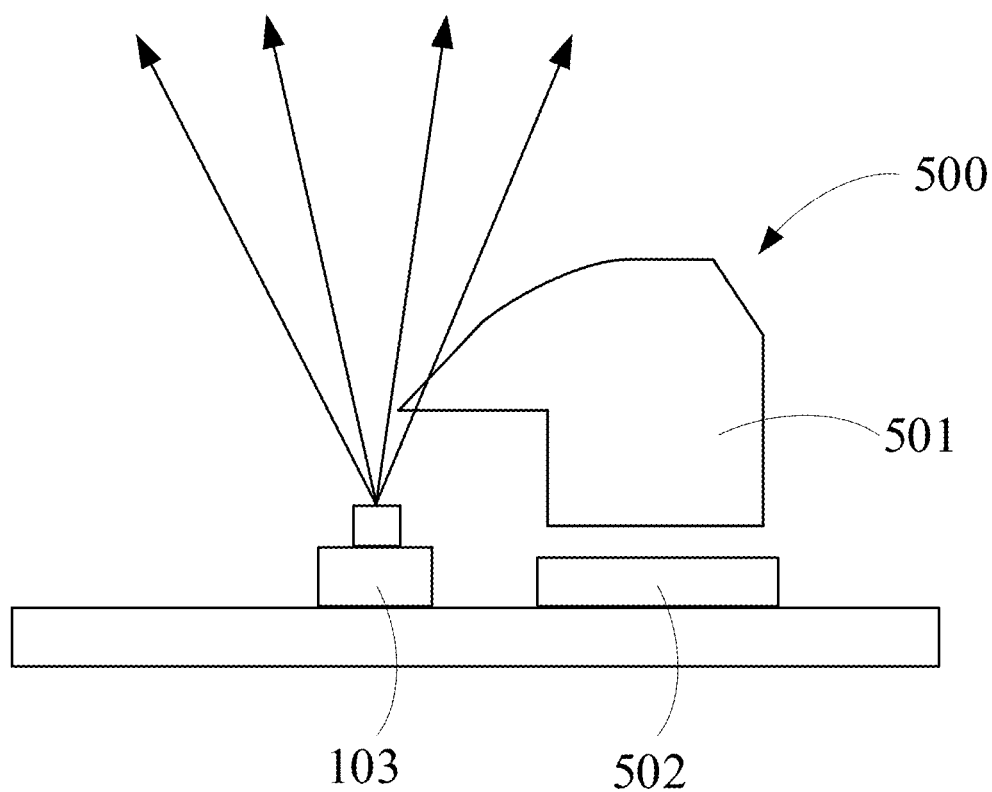
FIG. 14 is a schematic view illustrating a light source detection apparatus of a distance detection apparatus according to embodiments of the present application.

FIG. 14 is a schematic view illustrating embodiments of a light source detection apparatus 500. In the embodiments shown in FIG. 14, the light source detection apparatus 500 may include a light pipe 501 and a power detector 502 that are placed on one side of a light source 103. The light pipe 501 may guide a part of light emitted by the light source 103 to the power detector 502, and the power detector 502 may detect whether a function of the light source 103 is normal. In some embodiments, the light source 103 may be a laser transmitter; and the power detector 502 may be a laser power detector for detecting whether a function of the laser transmitter is normal.

It should be noted that relational terms such as "first" and "second" in this specification are used only to distinguish an entity or operation from another entity or operation, and do not require or imply any actual relationship or sequence between the entities or operations. The terms "comprise", "include", or any other variant thereof is intended to cover a non-exclusive inclusion, so that a process, a method, an article, or a device that includes a list of elements not only includes those elements but also includes other elements that are not expressly listed, or further includes elements inherent to the process, method, article, or device. An element preceded by "includes a . . . ", without more constraints, does not exclude existence of other identical elements in the process, method, article, or device that includes the element.

The method and apparatus provided by the embodiments of the present application are described in detail above. The principles and implementations of the present application are described herein by using specific examples. The description of the embodiments is merely provided to help understand the method and core idea of the present application. In addition, a person of ordinary skill in the art can make variations and modifications to the present application in terms of the specific implementations and application scopes according to the idea of the present application. Therefore, content of the specification shall not be construed as a limitation on the present application.

What is claimed is:

1. A distance detection apparatus, comprising:
   a light source configured to emit a beam;
   a transmitting and receiving lens configured to collimate the beam emitted by the light source, and converge at least a part of a return light of the beam reflected by a to-be-detected object;
   a detector, placed with the light source on a same side of the transmitting and receiving lens, configured to convert the at least a part of the return light that passes through the transmitting and receiving lens into an electrical signal to measure a distance between the to-be-detected object and the distance detection apparatus;
   an optical path change element, placed with the light source and the detector on the same side of the transmitting and receiving lens, configured to change an optical path of at least one of the beam emitted by the light source or the return light that passes through the transmitting and receiving lens;
   a light source position adjusting member to support the light source; and
   a detector supporter to support the detector, wherein
   the light source position adjusting member is also referred to as a light source focusing member, and is configured to adjust a location of the light source in a z-axis direction of the light source, and the detector supporter is configured to adjust a location of the detector in at least one of a z-axis direction, an x-axis direction, or a y-axis direction of the detector,
   the z-axis direction of the light source is a direction of a central axis of the light source, and the z-axis direction of the detector is a direction of a central axis of the detector, and
   the x-axis direction and the y-axis direction of the detector are two directions vertical to each other and vertical to the z-axis direction of the detector.

2. The distance detection apparatus according to claim 1, wherein one of the detector and the light source is placed on a focal plane of the transmitting and receiving lens, and the other one of the detector and the light source is placed on one side of an optical axis of the transmitting and receiving lens.

3. The distance detection apparatus according to claim 2, wherein the optical path change element deviates from the optical axis of the transmitting and receiving lens.

4. The distance detection apparatus according to claim 2, wherein the optical path change element is placed between the transmitting and receiving lens and the light source to allow the beam emitted by the light source to pass, and to project, to the detector, the return light that passes through the transmitting and receiving lens.

5. The distance detection apparatus according to claim 3, wherein the optical path change element is arranged on a side of the optical axis of the transmitting and receiving lens close to the light source.

6. The distance detection apparatus according to claim 1, further comprising:
   a lens supporter to support the transmitting and receiving lens;
   wherein the light source position adjusting member and the detector supporter are assembled in the lens supporter,
   the transmitting and receiving lens is mounted at one end of the lens supporter,
   one of the light source position adjusting member and the detector supporter is mounted at the other end of the lens supporter opposite to the transmitting and receiving lens, and
   the other one of the light source position adjusting member and the detector supporter is mounted at a lateral edge of the lens supporter.

7. The distance detection apparatus according to claim 6, further comprising:
   an optical path change element supporter to support the optical path change element,
   wherein the optical path change element supporter extends into the lens supporter, and the optical path change element is located in the lens supporter.

8. The distance detection apparatus according to claim 7, wherein the optical path change element supporter includes a cantilever that extends into the lens supporter, and the optical path change element is mounted at a free end of the cantilever.

9. The distance detection apparatus according to claim 6, further comprising:
   a light source supporter to support the light source, and configured to adjust a distance between the light source and the transmitting and receiving lens, wherein the light source supporter and the light source position adjusting member are fixed to each other.

10. The distance detection apparatus according to claim 1, wherein the detector supporter is configured to adjust the location of the detector in the z-axis direction, the x-axis direction, and the y-axis direction of the detector.

11. The distance detection apparatus according to claim 1, wherein the distance detection apparatus includes a plurality of light sources, a plurality of detectors corresponding to the light sources, and a plurality of optical path change elements corresponding to the light sources and the detectors.

12. The distance detection apparatus according to claim 1, wherein the distance detection apparatus includes a scanning module placed on one side of the transmitting and receiving lens opposite to the light source and a window located on one side of the scanning module opposite to the transmitting and receiving lens, wherein the scanning module is configured to project, to an external environment, a collimated beam that passes through the transmitting and receiving lens, and project the return light to the transmitting and receiving lens.

13. The distance detection apparatus according to claim 12, wherein the distance detection apparatus comprises a bandpass filter disposed on a receiving optical path for receiving the return light, and a refractive index of the bandpass filter is greater than 1.8.

14. The distance detection apparatus according to claim 13, wherein the bandpass filter includes;

a bandpass filter placed between the detector and the transmitting and receiving lens; or a long-wavelength pass film on one surface of each of the transmitting and receiving lens, the scanning module, and the window, and a short-wavelength pass film on another surface of each of the transmitting and receiving lens, the scanning module, and the window.

15. The distance detection apparatus according to claim 12, wherein the scanning module includes a first optical element and a driver connected to the first optical element, wherein the driver is configured to drive the first optical element to rotate around a rotation axis, so that the first optical element changes a direction of the collimated beam.

16. The distance detection apparatus according to claim 15, wherein a clump weight is disposed on one side of the scanning module, and the clump weight is located on an aperture of the scanning module, and a flare formed by the beam projected by the optical path change element deviates from the clump weight, or the clump weight is located outside an aperture of the scanning module, the optical path change element deviates from an optical axis of the transmitting and receiving lens, and a flare formed by the beam projected by the optical path change element is located at an edge of the scanning module.

17. The distance detection apparatus according to claim 15, wherein the scanning module includes a second optical element, the second optical element rotates around the rotation axis, and a rotation speed of the second optical element is different from a rotation speed of the first optical element.

18. The distance detection apparatus according to claim 12, wherein at least one of an inner surface of the window, a surface of the scanning module, a surface of the transmitting and receiving lens, a surface of the optical path change element, or a surface of a lens of the detector has a hydrophilic film.

19. The distance detection apparatus according to claim 1, wherein the location of the light source is adjustable to allow the light source to effectively locate at a focus of the transmitting and receiving lens; and the location of the detector is adjustable to allow the detector to receive most energy of the return light.

20. The distance detection apparatus according to claim 1, wherein an optical distance of the beam emitted by the light source from the light source to the optical path change element is equal to an optical distance of the return light from the optical path change element to the detector.

* * * * *